(12) United States Patent
Dawson et al.

(10) Patent No.: US 11,539,053 B2
(45) Date of Patent: Dec. 27, 2022

(54) METHOD OF MAKING COPPER ELECTRODE

(71) Applicant: Utility Global, Inc., Houston, TX (US)

(72) Inventors: Matthew Dawson, Draper, UT (US); Nicholas Farandos, London (GB); Jin Dawson, Draper, UT (US)

(73) Assignee: Utility Global, Inc., Houston, TX (US)

(*) Notice: Subject to any disclaimer, the term of this patent is extended or adjusted under 35 U.S.C. 154(b) by 4 days.

(21) Appl. No.: 15/931,585

(22) Filed: May 14, 2020

(65) Prior Publication Data
US 2020/0303749 A1 Sep. 24, 2020

Related U.S. Application Data

(63) Continuation-in-part of application No. 16/775,176, filed on Jan. 28, 2020, and a continuation-in-part of
(Continued)

(51) Int. Cl.
*H01M 4/88* (2006.01)
*H01M 4/90* (2006.01)
(Continued)

(52) U.S. Cl.
CPC ....... *H01M 4/8885* (2013.01); *H01M 4/8832* (2013.01); *H01M 4/9025* (2013.01);
(Continued)

(58) Field of Classification Search
CPC ............ H01M 4/0402; H01M 4/0457; H01M 4/8885; H01M 4/8832; H01M 4/9025;
(Continued)

(56) References Cited

U.S. PATENT DOCUMENTS 3,670,137 A * 6/1972 Inoue ..................... C23C 24/10
219/76.13
3,900,593 A * 8/1975 Herczog ................. G11B 5/842
219/121.75
(Continued)

FOREIGN PATENT DOCUMENTS

KR 20130047175 5/2013
WO WO2004019434 3/2004
(Continued)

OTHER PUBLICATIONS

Nicholas M. Farandos, Inkjet Printing for Solid Oxide Electrochemical Reactors, Imperial College London, UK, Department of Chemical Engineering Dissertation, May 2018.
(Continued)

*Primary Examiner* — Brian K Talbot
(74) *Attorney, Agent, or Firm* — Foley & Lardner LLP

(57) ABSTRACT

Herein discussed is an electrode comprising a copper or copper oxide phase and a ceramic phase, wherein the copper or copper oxide phase and the ceramic phase are sintered and are inter-dispersed with one another. Further discussed herein is a method of making a copper-containing electrode comprising: (a) forming a dispersion comprising ceramic particles and copper or copper oxide particles; (b) depositing the dispersion onto a substrate to form a slice; and (c) sintering the slice using electromagnetic radiation.

13 Claims, 8 Drawing Sheets

Related U.S. Application Data application No. 16/739,612, filed on Jan. 10, 2020, and a continuation-in-part of application No. 16/739,748, filed on Jan. 10, 2020, and a continuation-in-part of application No. 16/739,727, filed on Jan. 10, 2020, and a continuation-in-part of application No. 16/739,671, filed on Jan. 10, 2020, which is a continuation-in-part of application No. 16/707,084, filed on Dec. 9, 2019, and a continuation-in-part of application No. 16/707,066, filed on Dec. 9, 2019, and a continuation-in-part of application No. 16/707,046, filed on Dec. 9, 2019, which is a continuation-in-part of application No. 16/693,270, filed on Nov. 23, 2019, and a continuation-in-part of application No. 16/693,268, filed on Nov. 23, 2019, and a continuation-in-part of application No. 16/693,271, filed on Nov. 23, 2019, and a continuation-in-part of application No. 16/693,269, filed on Nov. 23, 2019, which is a continuation-in-part of application No. 16/684,864, filed on Nov. 15, 2019, and a continuation-in-part of application No. 16/684,838, filed on Nov. 15, 2019, which is a continuation-in-part of application No. 16/680,770, filed on Nov. 12, 2019, and a continuation-in-part of application No. 16/674,695, filed on Nov. 5, 2019, and a continuation-in-part of application No. 16/674,629, filed on Nov. 5, 2019, and a continuation-in-part of application No. 16/674,657, filed on Nov. 5, 2019, and a continuation-in-part of application No. 16/674,580, filed on Nov. 5, 2019.

(60) Provisional application No. 62/994,645, filed on Mar. 25, 2020, provisional application No. 62/987,706, filed on Mar. 10, 2020, provisional application No. 62/982,919, filed on Feb. 28, 2020, provisional application No. 62/970,655, filed on Feb. 5, 2020, provisional application No. 62/967,421, filed on Jan. 29, 2020, provisional application No. 62/955,443, filed on Dec. 31, 2019, provisional application No. 62/948,759, filed on Dec. 16, 2019, provisional application No. 62/944,756, filed on Dec. 6, 2019, provisional application No. 62/944,259, filed on Dec. 5, 2019, provisional application No. 62/941,358, filed on Nov. 27, 2019, provisional application No. 62/939,531, filed on Nov. 22, 2019, provisional application No. 62/934,808, filed on Nov. 13, 2019, provisional application No. 62/928,326, filed on Oct. 30, 2019, provisional application No. 62/927,627, filed on Oct. 29, 2019, provisional application No. 62/925,210, filed on Oct. 23, 2019, provisional application No. 62/912,626, filed on Oct. 8, 2019, provisional application No. 62/904,683, filed on Sep. 24, 2019, provisional application No. 62/899,087, filed on Sep. 11, 2019, provisional application No. 62/896,466, filed on Sep. 5, 2019, provisional application No. 62/895,416, filed on Sep. 3, 2019, provisional application No. 62/888,319, filed on Aug. 16, 2019, provisional application No. 62/877,699, filed on Jul. 23, 2019, provisional application No. 62/875,437, filed on Jul. 17, 2019, provisional application No. 62/869,322, filed on Jul. 1, 2019, provisional application No. 62/866,758, filed on Jun. 26, 2019, provisional application No. 62/864,492, filed on Jun. 20, 2019, provisional application No. 62/863,390, filed on Jun. 19, 2019, provisional application No. 62/856,736, filed on Jun. 3, 2019, provisional application No. 62/852,045, filed on May 23, 2019, provisional application No. 62/849,269, filed on May 17, 2019, provisional application No. 62/847,472, filed on May 14, 2019, provisional application No. 62/758,778, filed on Nov. 12, 2018.

(51) Int. Cl.
　*H01M 6/44*　　(2006.01)
　*H01M 4/04*　　(2006.01)
　*H01M 8/1086*　(2016.01)
　*H01M 8/00*　　(2016.01)

(52) U.S. Cl.
　CPC ........ *H01M 4/9066* (2013.01); *H01M 4/0402* (2013.01); *H01M 4/0457* (2013.01); *H01M 6/44* (2013.01); *H01M 8/004* (2013.01); *H01M 8/109* (2013.01)

(58) Field of Classification Search
　CPC ...... H01M 4/9066; H01M 6/44; H01M 8/004; H01M 8/109
　USPC .................................................. 427/58, 115
　See application file for complete search history.

(56) References Cited

U.S. PATENT DOCUMENTS

| | | |
|---|---|---|
| 4,374,906 A | 2/1983 | Breault et al. |
| 4,749,632 A | 6/1988 | Flandermeyer et al. |
| 4,992,341 A | 2/1991 | Smith et al. |
| 5,364,712 A | 11/1994 | Townsend |
| 5,431,967 A | 7/1995 | Manthiram et al. |
| 5,554,454 A | 9/1996 | Gardner et al. |
| 5,908,713 A | 5/1999 | Reiter et al. |
| 6,399,233 B1 | 6/2002 | Milliken et al. |
| 6,645,660 B2 | 11/2003 | Datz et al. |
| 6,890,679 B2 | 5/2005 | Johnsen et al. |
| 7,141,271 B2 | 11/2006 | Barbezat et al. |
| 7,682,725 B2 | 3/2010 | Datz et al. |
| 7,909,971 B2 | 3/2011 | Nuzzo et al. |
| 8,163,353 B2 | 4/2012 | Lu |
| 8,211,587 B2 | 7/2012 | Ruka et al. |
| 9,327,448 B2 | 5/2016 | Shah et al. |
| 10,236,528 B2 | 3/2019 | Jakus et al. |
| 10,350,329 B2 | 7/2019 | Shah et al. |
| 2002/0028367 A1 | 3/2002 | Sammes et al. |
| 2002/0081481 A1 | 6/2002 | Keegan |
| 2002/0102450 A1 | 8/2002 | Badding et al. |
| 2002/0153627 A1* | 10/2002 | Ray .......................... C25C 3/06 204/291 |
| 2003/0027033 A1* | 2/2003 | Seabaugh ............. C04B 41/009 429/489 |
| 2003/0134171 A1 | 7/2003 | Sarkar et al. |
| 2003/0190503 A1 | 10/2003 | Kumar et al. |
| 2003/0235738 A1 | 12/2003 | Zheng |
| 2004/0000489 A1 | 1/2004 | Zhang et al. |
| 2004/0151957 A1 | 8/2004 | Brooks et al. |
| 2004/0166380 A1 | 8/2004 | Gorte et al. |
| 2005/0016839 A1 | 1/2005 | Horne et al. |
| 2005/0053819 A1 | 3/2005 | Paz |
| 2005/0118493 A1 | 6/2005 | Datz et al. |
| 2006/0228613 A1 | 10/2006 | Bourgeois et al. |
| 2006/0292777 A1* | 12/2006 | Dunbar ............. H01L 21/02554 257/E29.295 |
| 2007/0117006 A1 | 5/2007 | Zhan et al. |
| 2007/0202378 A1 | 8/2007 | D'Urso et al. |
| 2008/0008826 A1 | 1/2008 | Coulon et al. |
| 2008/0085369 A1 | 4/2008 | Cai et al. |
| 2008/0160376 A1 | 7/2008 | Badding et al. |
| 2008/0178461 A1 | 7/2008 | Koripella et al. |
| 2008/0220307 A1 | 9/2008 | Fukushima et al. |
| 2008/0280189 A1* | 11/2008 | Kesler ................. H01M 4/9025 429/495 |
| 2010/0099000 A1 | 4/2010 | Kanba et al. |
| 2010/0136376 A1 | 5/2010 | Leah et al. |

(56) References Cited

U.S. PATENT DOCUMENTS

| | | | |
|---|---|---|---|
| 2011/0053041 A1* | 3/2011 | Tucker | C22C 32/0021 429/486 |
| 2011/0070493 A1 | 3/2011 | Gadkaree et al. | |
| 2011/0111292 A1 | 5/2011 | Kwon et al. | |
| 2011/0120537 A1 | 5/2011 | Liu et al. | |
| 2011/0171555 A1 | 7/2011 | Oloman | |
| 2011/0223509 A1* | 9/2011 | Greiner | H01M 4/9016 429/452 |
| 2012/0032120 A1 | 2/2012 | Tan et al. | |
| 2012/0070746 A1 | 3/2012 | Mikhaylik et al. | |
| 2012/0128872 A1* | 5/2012 | Doye | C23C 18/1216 427/160 |
| 2012/0183858 A1 | 7/2012 | Ellenwood et al. | |
| 2013/0026032 A1 | 1/2013 | Pal et al. | |
| 2013/0168228 A1* | 7/2013 | Ozin | B01J 23/888 977/773 |
| 2013/0228547 A1 | 9/2013 | Scorsone et al. | |
| 2013/0344383 A1 | 12/2013 | Loveness et al. | |
| 2014/0051014 A1 | 2/2014 | Steinwandel et al. | |
| 2014/0059846 A1 | 3/2014 | Schaefer | |
| 2014/0072702 A1 | 3/2014 | Sullivan | |
| 2014/0315095 A1 | 10/2014 | Honkawa et al. | |
| 2014/0352573 A1 | 12/2014 | Kasperchik et al. | |
| 2014/0367894 A1 | 12/2014 | Kramer et al. | |
| 2015/0035200 A1 | 2/2015 | Karpas et al. | |
| 2015/0158728 A1 | 6/2015 | Liang et al. | |
| 2015/0177620 A1* | 6/2015 | Ohta | H05K 3/1283 430/9 |
| 2015/0279505 A1* | 10/2015 | Omori | H05K 3/10 427/126.3 |
| 2015/0290860 A1 | 10/2015 | Shaw | |
| 2015/0291439 A1* | 10/2015 | Kinoshita | H05K 3/0091 423/604 |
| 2016/0007455 A1 | 1/2016 | Kawato et al. | |
| 2016/0036062 A1* | 2/2016 | Wang | H01M 4/8875 429/535 |
| 2016/0067827 A1 | 3/2016 | Zediker | |
| 2016/0104882 A1 | 4/2016 | Yushin et al. | |
| 2016/0167132 A1 | 6/2016 | Panat | |
| 2016/0197356 A1 | 7/2016 | Montinaro et al. | |
| 2016/0368056 A1 | 12/2016 | Swaminathan et al. | |
| 2017/0012319 A1 | 1/2017 | Anandan et al. | |
| 2017/0081534 A1 | 3/2017 | Shah et al. | |
| 2017/0098857 A1* | 4/2017 | Carlson | H01M 10/0525 |
| 2017/0222236 A1 | 8/2017 | Armstrong et al. | |
| 2017/0346084 A1 | 11/2017 | Sakshaug et al. | |
| 2018/0006301 A1 | 1/2018 | Im et al. | |
| 2018/0019493 A1 | 1/2018 | Jakus et al. | |
| 2018/0056292 A1 | 3/2018 | Kwon et al. | |
| 2018/0212083 A1 | 7/2018 | Kim et al. | |
| 2018/0250746 A1 | 9/2018 | Symeonidis et al. | |
| 2018/0301420 A1 | 10/2018 | Kim et al. | |
| 2019/0207227 A1 | 7/2019 | Farandos et al. | |
| 2020/0144653 A1* | 5/2020 | Hall | H01M 8/0202 |

FOREIGN PATENT DOCUMENTS

| | | | |
|---|---|---|---|
| WO | WO-2007/048253 A1 | | 5/2007 |
| WO | WO 2015/076005 | * | 5/2015 |
| WO | WO2015076005 | | 5/2015 |
| WO | WO2017207514 | | 12/2017 |
| WO | WO2017221010 | | 12/2017 |
| WO | WO2018038954 | | 3/2018 |
| WO | WO2018068662 | | 4/2018 |
| WO | WO2018068663 | | 5/2018 |
| WO | WO2018080537 | | 5/2018 |

OTHER PUBLICATIONS

N.M. Farandos et al., Three-dimensiona Inkjet Printed Solid Oxide Electrochemical Reactors, Electrochemica Acta 213 (2016), 324-331.

N. Geisendorfer, Efficient and Scalable Fabrication of Solid Oxide Fuel Cells via 3D-Printing, NASA, Sep. 15, 2017.

N. Farandos, Additive Manufacturing—The Printing Press Meets Energy Storage?, Energy Futures Lab Blog, Feb. 14, 2017.

X.Y. Tai et al, Accelerating Fuel Cell Development With Additive Manufacturing Technologies, Fuel Cells, vol. 19 (2016), 636-650.

Akanksha Umrani Fabrication of Micro Pillar Arrays Via Aerosol Jet Printing, Rochester Institute of Technology, Rochester, NY, USA, Dissertation, Jan. 2015.

Wang et al. Electrical and Ionic Conductivity of Gd-Doped Ceria, J Electrochemical Society, vol. 147, pp. 3606-3609, 2000.

Kharton et al., Mixed Electronic and Ionic conductivity, Solid State Ionics, 1997, v104, p. 68, 76.

V. Duboviks, Study of Carbon Contamination in Solid Oxide Cells, UK, Dept of Earth Science amd Engineering, 2014.

International Search Report and Written Opinion issued in PCT/US2021/032427 dated Aug. 31, 2021, 12 pages.

\* cited by examiner

METHOD OF MAKING COPPER ELECTRODE

CROSS-REFERENCE TO RELATED APPLICATIONS

This application is a continuation-in-part application of U.S. patent application Ser. No. 16/775,176, filed Jan. 28, 2020, which is a continuation-in-part application of U.S. patent application Ser. Nos. 16/739,612, 16/739,671, 16/739,727, and 16/739,748, filed Jan. 10, 2020, which are continuation-in-part applications of U.S. patent application Ser. Nos. 16/707,046, 16/707,066 and 16/707,084, filed Dec. 9, 2019, which are continuation-in-part applications of U.S. patent application Ser. Nos. 16/699,453 and 16/699,461, filed Nov. 29, 2019, which are continuation-in-part applications of U.S. patent application Ser. Nos. 16/693,268, 16/693,269, 16/693,270, and 16/693,271, filed Nov. 23, 2019, which are continuation-in-part applications of U.S. patent application Ser. Nos. 16/684,838 and 16/684,864 filed Nov. 15, 2019, which are continuation-in-part applications of U.S. patent application Ser. No. 16/680,770 filed Nov. 12, 2019, which is a continuation-in-part application of U.S. patent application Ser. Nos. 16/674,580, 16/674,629, 16/674,657, 16/674,695 all filed Nov. 5, 2019, each of which claims the benefit under 35 U.S.C. 119(e) of U.S. Provisional Patent Application No. 62/756,257 filed Nov. 6, 2018, U.S. Provisional Patent Application No. 62/756,264 filed Nov. 6, 2018, U.S. Provisional Patent Application No. 62/757,751 filed Nov. 8, 2018, U.S. Provisional Patent Application No. 62/758,778 filed Nov. 12, 2018, U.S. Provisional Patent Application No. 62/767,413 filed Nov. 14, 2018, U.S. Provisional Patent Application No. 62/768,864 filed Nov. 17, 2018, U.S. Provisional Patent Application No. 62/771,045 filed Nov. 24, 2018, U.S. Provisional Patent Application No. 62/773,071 filed Nov. 29, 2018, U.S. Provisional Patent Application No. 62/773,912 filed Nov. 30, 2018, U.S. Provisional Patent Application No. 62/777,273 filed Dec. 10, 2018, U.S. Provisional Patent Application No. 62/777,338 filed Dec. 10, 2018, U.S. Provisional Patent Application No. 62/779,005 filed Dec. 13, 2018, U.S. Provisional Patent Application No. 62/780,211 filed Dec. 15, 2018, U.S. Provisional Patent Application No. 62/783,192 filed Dec. 20, 2018, U.S. Provisional Patent Application No. 62/784,472 filed Dec. 23, 2018, U.S. Provisional Patent Application No. 62/786,341 filed Dec. 29, 2018, U.S. Provisional Patent Application No. 62/791,629 filed Jan. 11, 2019, U.S. Provisional Patent Application No. 62/797,572 filed Jan. 28, 2019, U.S. Provisional Patent Application No. 62/798,344 filed Jan. 29, 2019, U.S. Provisional Patent Application No. 62/804,115 filed Feb. 11, 2019, U.S. Provisional Patent Application No. 62/805,250 filed Feb. 13, 2019, U.S. Provisional Patent Application No. 62/808,644 filed Feb. 21, 2019, U.S. Provisional Patent Application No. 62/809,602 filed Feb. 23, 2019, U.S. Provisional Patent Application No. 62/814,695 filed Mar. 6, 2019, U.S. Provisional Patent Application No. 62/819,374 filed Mar. 15, 2019, U.S. Provisional Patent Application No. 62/819,289 filed Mar. 15, 2019, U.S. Provisional Patent Application No. 62/824,229 filed Mar. 26, 2019, U.S. Provisional Patent Application No. 62/825,576 filed Mar. 28, 2019, U.S. Provisional Patent Application No. 62/827,800 filed Apr. 1, 2019, U.S. Provisional Patent Application No. 62/834,531 filed Apr. 16, 2019, U.S. Provisional Patent Application No. 62/837,089 filed Apr. 22, 2019, U.S. Provisional Patent Application No. 62/840,381 filed Apr. 29, 2019, U.S. Provisional Patent Application No. 62/844,125 filed May 7, 2019, U.S. Provisional Patent Application No. 62/844,127 filed May 7, 2019, U.S. Provisional Patent Application No. 62/847,472 filed May 14, 2019, U.S. Provisional Patent Application No. 62/849,269 filed May 17, 2019, U.S. Provisional Patent Application No. 62/852,045 filed May 23, 2019, U.S. Provisional Patent Application No. 62/856,736 filed Jun. 3, 2019, U.S. Provisional Patent Application No. 62/863,390 filed Jun. 19, 2019, U.S. Provisional Patent Application No. 62/864,492 filed Jun. 20, 2019, U.S. Provisional Patent Application No. 62/866,758 filed Jun. 26, 2019, U.S. Provisional Patent Application No. 62/869,322 filed Jul. 1, 2019, U.S. Provisional Patent Application No. 62/875,437 filed Jul. 17, 2019, U.S. Provisional Patent Application No. 62/877,699 filed Jul. 23, 2019, U.S. Provisional Patent Application No. 62/888,319 filed Aug. 16, 2019, U.S. Provisional Patent Application No. 62/895,416 filed Sep. 3, 2019, U.S. Provisional Patent Application No. 62/896,466 filed Sep. 5, 2019, U.S. Provisional Patent Application No. 62/899,087 filed Sep. 11, 2019, U.S. Provisional Patent Application No. 62/904,683 filed Sep. 24, 2019, U.S. Provisional Patent Application No. 62/912,626 filed Oct. 8, 2019, U.S. Provisional Patent Application No. 62/925,210 filed Oct. 23, 2019, U.S. Provisional Patent Application No. 62/927,627 filed Oct. 29, 2019, U.S. Provisional Patent Application No. 62/928,326 filed Oct. 30, 2019, U.S. Provisional Patent Application No. 62/934,808 filed Nov. 13, 2019, U.S. Provisional Patent Application No. 62/939,531 filed Nov. 22, 2019, U.S. Provisional Patent Application No. 62/941,358 filed Nov. 27, 2019, U.S. Provisional Patent Application No. 62/944,259 filed Dec. 5, 2019, U.S. Provisional Patent Application No. 62/944,756 filed Dec. 6, 2019, U.S. Provisional Patent Application No. 62/948,759 filed Dec. 16, 2019, U.S. Provisional Patent Application No. 62/955,443 filed Dec. 31, 2019, U.S. Provisional Patent Application No. 62/970,655 filed Feb. 5, 2020, U.S. Provisional Patent Application No. 62/982,919 filed Feb. 28, 2020, U.S. Provisional Patent Application No. 62/987,706 filed Mar. 10, 2020, and U.S. Provisional Patent Application No. 62/994,645 filed Mar. 25, 2020. The entire disclosures of each of these listed applications are hereby incorporated herein by reference.

TECHNICAL FIELD

This invention generally relates to electrochemical reactors. More specifically, this invention relates to copper electrodes in the electrochemical reactors and method of making.

BACKGROUND

A fuel cell is an electrochemical apparatus or reactor that converts the chemical energy from a fuel into electricity through an electrochemical reaction. Sometimes, the heat generated by a fuel cell is also usable. There are many types of fuel cells. For example, proton-exchange membrane fuel cells (PEMFCs) are built out of membrane electrode assemblies (MEA) which include the electrodes, electrolyte, catalyst, and gas diffusion layers. An ink of catalyst, carbon, and electrode are sprayed or painted onto the solid electrolyte and carbon paper is hot pressed on either side to protect the inside of the cell and also act as electrodes. The most important part of the cell is the triple phase boundary where the electrolyte, catalyst, and reactants mix and thus where the cell reactions actually occur. The membrane must not be electrically conductive so that the half reactions do not mix.

PEMFCs are good candidates for vehicle and other mobile applications of all sizes (e.g., mobile phones) because they are compact. However, water management is crucial to performance. Too much water will flood the membrane and too little will dry it. In both cases, power output will drop. Water management is a difficult problem in PEM fuel cell systems, mainly because water in the membrane is attracted toward the cathode of the cell through polarization. Furthermore, the platinum catalyst on the membrane is easily poisoned by carbon monoxide (CO level needs to be no more than one part per million). The membrane is also sensitive to things like metal ions which can be introduced by corrosion of metallic bipolar plates, metallic components in the fuel cell system or from contaminants in the fuel and/or oxidant.

Solid oxide fuel cells (SOFCs) are a different class of fuel cells that use a solid oxide material as the electrolyte. SOFCs use a solid oxide electrolyte to conduct negative oxygen ions from the cathode to the anode. The electrochemical oxidation of the oxygen ions with fuel (e.g., hydrogen, carbon monoxide) occurs on the anode side. Some SOFCs use proton-conducting electrolytes (PC-SOFCs) which transport protons instead of oxygen ions through the electrolyte. Typically, SOFCs using oxygen ion conducting electrolytes have higher operating temperatures than PC-SOFCs. In addition, SOFCs do not typically require expensive platinum catalyst materials which are typically necessary for lower temperature fuel cells (i.e., PEMFCs), and are not vulnerable to carbon monoxide catalyst poisoning. Solid oxide fuel cells have a wide variety of applications, such as auxiliary power units for homes and vehicles as well as stationary power generation units for data centers. SOFCs comprise interconnects, which are placed between each individual cell so that the cells are connected in series and that the electricity generated by each cell is combined. One category of SOFCs are segmented-in-series (SIS) type SOFCs. The electrical current flow in SIS type SOFCs is parallel to the electrolyte in the lateral direction. Contrary to the SIS type SOFC, a different category of SOFC has electrical current flow perpendicular to the electrolyte in the lateral direction. These two categories of SOFCs are connected differently and assembled differently.

Copper-containing anodes in SOFC have excellent anti-coking properties, tolerance to sulfur, and enable the direct utilization of hydrocarbons. However, the making of such copper-containing anodes can be expensive, time consuming and labor intensive. In one method, the copper has to be introduced as a salt solution via infiltration. For at least this reason, copper-containing anodes in SOFC have not been generally adopted.

As such, there is continuing need and interest to develop copper electrodes and methods of making that are commercially meaningful and industrially useful. Fuel cells are simply examples of electrochemical reactors. The copper electrodes are applicable, not only for solid oxide fuel cells, but also for other kinds of electrochemical reactors, such as electrochemical gas producers and electrolysers.

SUMMARY

Further aspects and embodiments are provided in the following drawings, detailed description and claims. Unless specified otherwise, the features as described herein are combinable and all such combinations are within the scope of this disclosure.

Herein discussed is an electrode comprising a copper or copper oxide phase and a ceramic phase, wherein the copper or copper oxide phase and the ceramic phase are sintered and are inter-dispersed with one another. In an embodiment, the copper or copper oxide phase percolates the electrode. In an embodiment, the ceramic phase comprises CGO, CGO-YSZ, CGO-SSZ, SDC, SDC-YSZ, SDC-SSZ, undoped ceria, undoped ceria-YSZ, undoped ceria-SSZ, or combinations thereof. In an embodiment, the copper or copper oxide phase comprises sintered copper particles or sintered copper oxide particles, and wherein the ceramic phase comprises sintered ceramic particles. In an embodiment, the electrode further comprises cobalt, cobalt oxide, gold, gold oxide, lanthanum chromite, stainless steel, or combinations thereof. In an embodiment, the electrode comprises fluid channels or fluid dispersing components.

Further discussed herein is a method of making a copper-containing electrode comprising: (a) forming a dispersion comprising ceramic particles and copper or copper oxide particles; (b) depositing the dispersion onto a substrate to form a slice; and (c) sintering the slice using electromagnetic radiation. In an embodiment, the method comprises drying the slice between (b) and (c) using a non-contact dryer. In an embodiment, the non-contact dryer comprises infrared heater, near infrared heater, hot air blower, ultraviolet light source, or combinations thereof.

In an embodiment, the dispersion has a pH that is alkaline. In an embodiment, at least a population of the ceramic particles are smaller than the copper or copper oxide particles on average. In an embodiment, at least another population of the ceramic particles are larger than the copper or copper oxide particles on average.

In an embodiment, the copper or copper oxide particles form a copper or copper oxide phase and the ceramic particles form a ceramic phase, wherein the copper or copper oxide phase and the ceramic phase are inter-dispersed with one another. In an embodiment, the copper or copper oxide phase percolates the slice.

In an embodiment, the ceramic particles comprise CGO, CGO-YSZ, CGO-SSZ, SDC, SDC-YSZ, SDC-SSZ, undoped ceria, undoped ceria-YSZ, undoped ceria-SSZ, or combinations thereof. In an embodiment, depositing comprises inkjet printing, ultrasonic inkjet printing, material jetting, binder jetting, aerosol jetting, aerosol jet printing, dip coating, spraying, spin coating, brush coating, pasting, or combinations thereof. In an embodiment, the substrate is planar or tubular.

In an embodiment, the method comprises repeating (b) and (c) to form another slice on top of the slice. In an embodiment, the electromagnetic radiation is provided by a xenon lamp. In an embodiment, the copper-containing electrode comprises fluid channels or fluid dispersing components.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
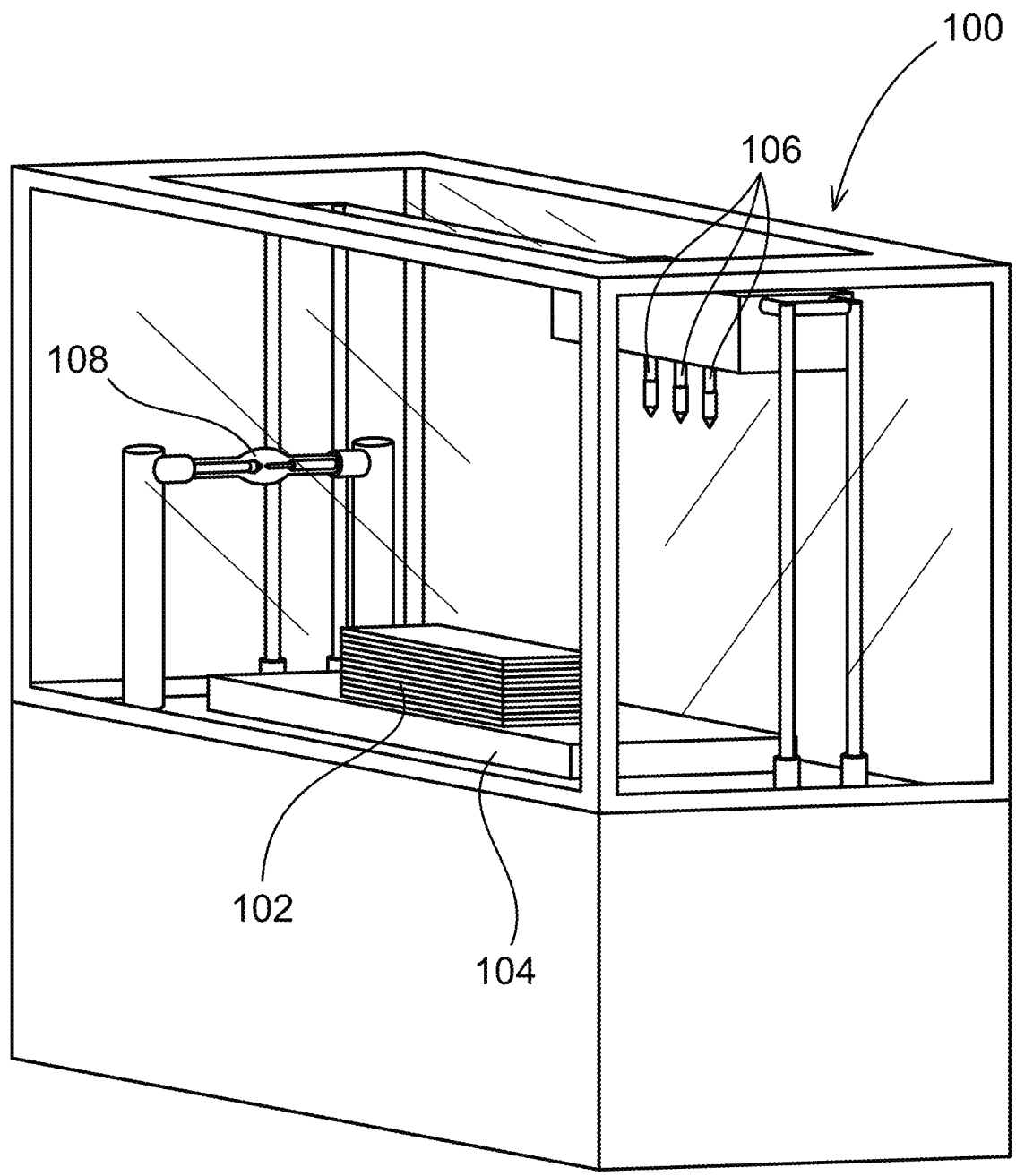
FIG. 1 illustrates a system for integrated deposition and heating using electromagnetic radiation (EMR), according to an embodiment of the disclosure.

Embodiments of methods, materials and processes described herein are directed towards copper-containing electrodes for electrochemical reactors. Electrochemical reactors include solid oxide fuel cells, solid oxide fuel cell stacks, electrochemical gas producers, electrochemical compressors, solid state batteries, electrolysers, or solid oxide flow batteries.

Definitions

The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

As used herein, the phrase A and B are inter-dispersed with one another means that phase A and phase B coexist and intertwine with one another and excludes the case wherein one phase largely coats the other phase. In other words, when phases A and B are inter-dispersed with one another, the two phases are identifiable and neither phase completely nor substantially coats the other phase. In this way, fluids passing into the inter-dispersed phases make contact with both phases.

As used herein, to say that A percolates B means that particles of A, sometimes in clusters, are connected to form a larger network of A that connects one side of the electrode to the other, resulting in connectivity of A throughout B. For example, if a copper phase (A) percolates an electrode (B), then the electrode is able to conduct electrons through the copper phase. This does not necessarily mean that every particle of A is connected to the network but does mean that there are enough particles connected to form a continuous phase from one side to the other.

The term "in situ" in this disclosure refers to the treatment (e.g., heating) process being performed either at the same location or in the same device of the forming process of the compositions or materials. For example, the deposition process and the heating process are performed in the same device and at the same location, in other words, without changing the device and without changing the location within the device. For example, the deposition process and the heating process are performed in the same device at different locations, which is also considered in situ.

In this disclosure, a major face of an object is the face of the object that has a surface area larger than the average surface area of the object, wherein the average surface area of the object is the total surface area of the object divided by the number of faces of the object. In some cases, a major face refers to a face of an item or object that has a larger surface area than a minor face. In the case of planar fuel cells or non-SIS type fuel cells, a major face is the face or surface in the lateral direction.

As used herein, lateral refers to the direction that is perpendicular to the stacking direction of the layers in a non-SIS type fuel cell. Thus, lateral direction refers to the direction that is perpendicular to the stacking direction of the layers in a fuel cell or the stacking direction of the slices to form an object during deposition. Lateral also refers to the direction that is the spread of deposition process.

Syngas (i.e., synthesis gas) in this disclosure refers to a mixture consisting primarily of hydrogen, carbon monoxide and carbon dioxide.

In this disclosure, absorbance is a measure of the capacity of a substance to absorb electromagnetic radiation (EMR) of a wavelength.

Absorption of radiation refers to the energy absorbed by a substance when exposed to the radiation.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow. For example, an impermeable layer has a permeability of less than 1 micro darcy, or less than 1 nano darcy.

In this disclosure, an interconnect having no fluid dispersing element refers to an interconnect having no elements (e.g., channels) to disperse a fluid. A fluid may comprise a gas or a liquid or a mixture of a gas and a liquid. Such fluids may include one or more of hydrogen, methane, ethane, propane, butane, oxygen, ambient air or light hydrocarbons (i.e., pentane, hexane, octane). Such an interconnect may have inlets and outlets (i.e., openings) for materials or fluids to pass through.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece. In this disclosure and the appended claims, $T_{sinter}$ refers to the temperature at which this phenomenon begins to take place.

In this disclosure, copper electrode refers to an electrode that contains copper either as an element or as a compound. As used herein, copper oxide includes both $CuO$ and $Cu_2O$.

For illustrative purposes, the production of solid oxide fuel cells (SOFCs) will be used as an example system herein to describe the various embodiments. As one in the art recognizes though, the methodologies and the manufacturing processes described herein are applicable to any electrochemical device, reactor, vessel, catalyst, etc. Examples of electrochemical devices or electrochemical reactors includes electrochemical (EC) gas producer, electrochemical (EC) compressor, solid oxide fuel cells, solid oxide fuel cell stack, electrolyser, solid state battery, or solid oxide flow battery. Catalysts include Fischer Tropsch (FT) catalysts or reformer catalysts. Reactor/vessel includes FT reactor or heat exchanger.

Overview

Embodiments of the invention are directed towards copper-containing electrodes for electrochemical reactors. These electrochemical reactors can include solid oxide fuel cells (SOFC's), solid oxide fuel cell stacks, electrochemical gas producers, electrochemical compressors, solid state batteries, electrolysers, or solid oxide flow batteries. The electrodes can be described as having both a copper or copper oxide phase and a ceramic phase. These two phases are sintered and are inter-dispersed with one another. By being inter-dispersed, fluids entering the electrode can contact both phases, thus facilitating the function of the ceramic phase of the electrode in the electrochemical cell. In other words, if the copper or copper oxide phase completely coated the ceramic phase, the ceramic phase could not perform its function in the electrochemical cell.

Preferably, the copper or copper oxide phase percolates the ceramic phase. In this way, a conductive pathway is formed from one side of the electrode to the other.

In some embodiments, it is preferred to use copper oxide when making the electrode because particles of copper oxide are more compatible to sinter with the ceramic particles. For example, the melting points are not as disparate. In these embodiments, it may be preferable to sell the electrodes still containing copper oxide phase or to use such electrodes in assembling the electrochemical reactor. Nevertheless, in each case where copper oxide is used to make the electrode, at least a portion of the copper oxide is reduced to form a copper phase, i.e. a phase that conducts electrons, before operation of the electrochemical reactor. For example, an electrochemical cell, such as a SOFC, can be assembled with an electrode having a copper oxide phase. At the initiation of such a SOFC, a reducing gas, such as $H_2$ can be run through electrode to create the copper phase.

Copper Electrode

An electrode of this disclosure comprises a copper or copper oxide phase and a ceramic phase, wherein the copper or copper oxide phase and the ceramic phase are sintered and are inter-dispersed with one another. This is different from existing copper electrodes, wherein the copper is introduced into the electrodes via infiltration (e.g., as a copper salt solution) so that the copper phase coats the ceramic phase and as such the two phases are not inter-dispersed as that term is used herein. This is also different from electrodes made via co-sintering or oven sintering/heating, wherein the copper phase is melted into a pool or lake due to lower melting point to achieve sintering of the ceramic phase and as such the copper phase tends to coat the ceramic phase.

Figure 4A:
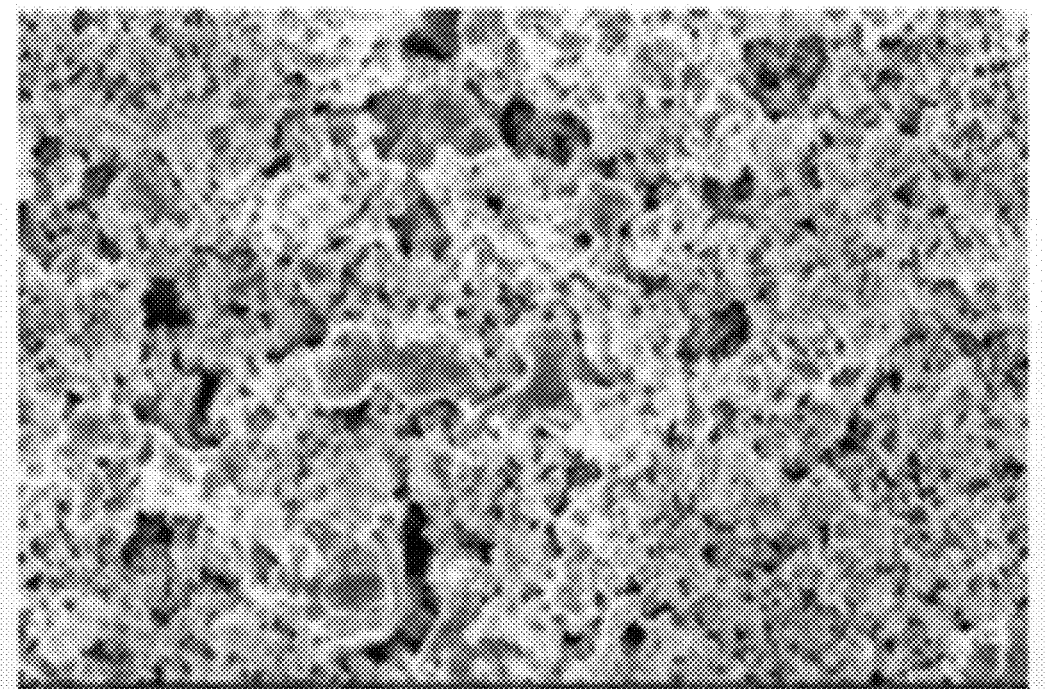
FIG. 4A is a scanning electron micrograph (SEM) at a magnification of 15,000 of a sintered CuO-CGO electrode, according to an embodiment of this disclosure.
Figure 4B:
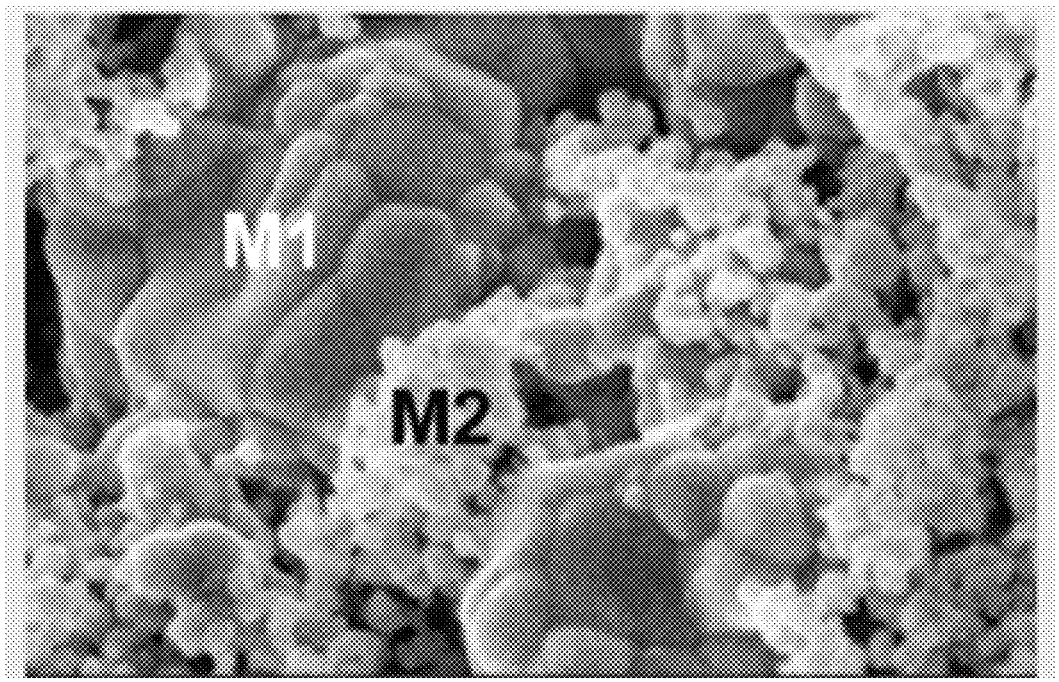
FIG. 4B is a scanning electron micrograph (SEM) at a magnification of 80,000 to show the details of the two phases in the CuO-CGO electrode, according to an embodiment of this disclosure.

Without wishing to be limited by any particular theory, we have unexpectedly discovered that in the electrode of this disclosure, which is sintered via EMR or photonic sintering, both the copper or copper oxide phase and the ceramic phase are sintered without the copper or copper oxide phase coating the ceramic phase. This can be seen in. the scanning electron micrographs (SEM's) of FIGS. 4A and 4B. FIG. 4A is an SEM with a magnification of 15,000 of a portion of an electrode made according to the invention. FIG. 4B is an SEM with a magnification of 80,000, which shows the copper oxide particles and CGO (ceria gadolinium oxide, also referred to as gadolinium doped ceria GDC) particles sintered using a xenon lamp. The sintered copper oxide phase is labeled with M1, while the sintered CGO phase is labeled with M2. As can be seen, the sintered copper oxide phase and the sintered ceramic phase are inter-dispersed with one another and the copper oxide phase does not coat the CGO phase. The porosity of the electrode is also shown in FIG. 4B. As can be seen, a fluid entering this electrode is able to contact both phases. As a result, the CGO phase is able to perform its function in the electrode.

In various embodiments, the copper or copper oxide phase percolates the electrode, meaning that enough of the copper or copper oxide particles are connected to form a network from one side of the electrode to the other. In this way, the copper particles or the copper oxide particles when reduced to form copper form a path to conduct electrons from one side of the electrode to the other.

In an embodiment, the ceramic phase comprises CGO, CGO-YSZ, CGO-SSZ, SDC, SDC-YSZ, SDC-SSZ, undoped ceria, undoped ceria-YSZ, undoped ceria-SSZ, or combinations thereof. At present, CGO is preferred.

In an embodiment, the copper or copper oxide phase comprises sintered copper particles or sintered copper oxide particles. In an embodiment, the ceramic phase comprises sintered ceramic particles. In an embodiment, the electrode comprises fluid channels or fluid dispersing components.

In an embodiment, a method of making a copper-containing electrode comprises: (a) forming a dispersion comprising ceramic particles and copper or copper oxide particles; (b) depositing the dispersion onto a substrate to form a slice; and (c) sintering the slice using electromagnetic radiation (EMR). A dispersing agent may be used in forming the dispersion. In an embodiment, the method comprises drying the slice between (b) and (c) using a non-contact dryer. In an embodiment, the non-contact dryer is an infrared heater, near infrared heater, hot air blower, ultraviolet light source, or combinations thereof. In an embodiment, the slice has a thickness in the range of 200 nm-20 microns. In an embodiment, the slice has a thickness in the range of 200 nm-10 microns. In an embodiment, the slice has a thickness in the range of 200 nm-5 microns. In an embodiment, the slice has a thickness in the range of 200 nm-2 microns. The sintering parameters depend on various factors such as slice thickness, slice composition, distance between the slice and the EMR source, etc.; and thus, the sintering parameters need to be adjusted accordingly.

In an embodiment, the copper or copper oxide phase constitutes 10-90 wt % of the electrode on the basis of total solids. In an embodiment, the copper or copper oxide phase constitutes 20-80 wt % of the electrode on the basis of total solids. In an embodiment, the copper or copper oxide phase constitutes 30-70 wt % of the electrode on the basis of total solids.

In an embodiment, the dispersion has a pH that is alkaline. In an embodiment, the dispersion contains an organic solvent, such as an alcohol (isopropyl alcohol) or isophorone. In an embodiment, the dispersion comprises a dispersant, a surfactant, or combination thereof. In an embodiment, the dispersion comprises a liquid, wherein the liquid includes water, isophorone, isopropyl alcohol (IPA), ethanol, butanol, a dispersant, a surfactant, or combinations thereof. Dispex® is an example of a dispersant that is applicable in aqueous or organic solvents. Other dispersants are known to one skilled in the art and are within the scope of this disclosure. In various embodiments, the particles are dispersed in a liquid with a weight concentration of from about 1% to about 30%, or from about 1% to about 20%, or from about 1% to about 10%.

Various dispersing methods may be used, such as mechanical stirring, magnetic stirring, sonication. In various embodiments, dispersing takes place at room temperature and pressure. In various embodiments, dispersing takes place for a few minutes or a few hours depending on the volume and concentration of the dispersion and the dispersing method.

In an embodiment, at least a population of the ceramic particles are smaller than the copper or copper oxide particles on average. In an embodiment, at least another population of the ceramic particles are larger than the copper or copper oxide particles on average. For example, a population of the ceramic particles have an average diameter of 10-30 nm, another population of the ceramic particles have an average diameter of 160-300 nm, and the copper or copper oxide particles have an average diameter of 40-120 nm. In an embodiment, the ceramic particles have an average diameter of 10-1000 nm, and the copper or copper oxide particles have an average diameter of 10-1000 nm.

In an embodiment, the electrode further comprises cobalt, cobalt oxide, gold, gold oxide, lanthanum chromite, stainless steel, or combinations thereof. In an embodiment, the electrode further comprises nickle, nickle oxide, or combinations thereof. In an embodiment, the electrode further comprises ruthenium, rhodium, palladium, osmium, iridium, platinum, or combinations thereof. In an embodiment, copper in the electrode may be replaced by gold, ruthenium, rhodium, palladium, osmium, iridium, platinum, or combinations thereof. The method of this disclosure is applicable for making electrodes using these alternative metals as the conductive phase of the electrode.

The porosity of the electrode provides access for fluids to pass into the electrode to facilitate operation of the electrochemical cell. In an embodiment, the electrode has a porosity of 20% or higher without accounting for fluid channels or fluid dispersing components. In an embodiment, the electrode has a porosity of 30% or higher without accounting for fluid channels or fluid dispersing components. In an embodiment, the electrode has a porosity of 40% or higher without accounting for fluid channels or fluid dispersing components.

In an embodiment, the ceramic particles comprise CGO, CGO-YSZ, CGO-SSZ, SDC, SDC-YSZ, SDC-SSZ, undoped ceria, undoped ceria-YSZ, undoped ceria-SSZ, or combinations thereof. In an embodiment, depositing comprises inkjet printing, ultrasonic inkjet printing, material jetting, binder jetting, aerosol jetting, aerosol jet printing, dip coating, spraying, spin coating, brush coating, pasting, or combinations thereof. In an embodiment, the substrate is planar or tubular.

In an embodiment, the method comprises repeating (b) and (c) to form another slice on top of the slice. In an embodiment, the electromagnetic radiation is provided by a xenon lamp. In an embodiment, the copper-containing electrode comprises fluid channels or fluid dispersing components.

When the electrode is initiated into operation, a reducing gas (such as CO or $H_2$) is passed through the electrode to reduce at least a portion of copper oxide to copper so that the electrode is able to conduct electrons. The reduction process takes place at a temperature no greater than 1000° C. or no greater than 900° C. In some cases, the reduction process takes place at a temperature in the range of from 100° C. to 350° C. The duration of reduction depends on various factors, such as the size and number of the electrodes, reducing gas composition, reducing gas temperature, reducing gas pressure, and reducing gas flow rate.

Integrated Deposition and Heating

In various embodiments, a copper electrode is made using integrated deposition and heating method and system as discussed in this disclosure. Disclosed herein is a method comprising depositing a composition on a substrate slice by slice (this may also be described as line-by-line deposition) to form an object; heating in situ the object using electromagnetic radiation (EMR); wherein the composition comprises a first material and a second material, wherein the second material has a higher absorbance of EMR than the first material. In various embodiments, heating may cause an effect comprising drying, curing, sintering, annealing, sealing, alloying, evaporating, restructuring, foaming or combinations thereof. In some embodiments, the EMR has a peak wavelength ranging from 10 to 1500 nm and a minimum energy density of 0.1 Joule/$cm^2$ wherein the peak wavelength is on the basis of irradiance with respect to wavelength. The EMR may comprise one or more of UV light, near ultraviolet light, near infrared light, infrared light, visible light, laser or electron beam.

FIG. 1 illustrates a system for integrated deposition and heating using electromagnetic radiation (EMR), according to an embodiment of the disclosure. FIG. 1 further illustrates system 100 an object 102 on a receiver 104 formed by deposition nozzles 106 and EMR 108 for heating in situ, according to an embodiment of this disclosure. Receiver 104 may be a platform that moves and may further receive deposition, heat, irradiation, or combinations thereof. Receiver 104 may also be referred to as a chamber wherein the chamber may be completely enclosed, partially enclosed or completely open to the atmosphere.

In some embodiments, the first material comprises yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel or combinations thereof. The first material may comprise YSZ, SSZ, CGO, SDC, NiO-YSZ, LSM-YSZ, CGO-LSCF, doped lanthanum chromite, stainless steel or combinations thereof. The second material may comprise carbon, nickel oxide, nickel, silver, copper, copper oxides, CGO, SDC, NiO-YSZ, NiO-SSZ, LSCF, LSM, doped lanthanum chromite ferritic steels or combinations thereof.

In some embodiments, object 102 comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel or combinations thereof.

In some embodiments, the second material may be deposited in the same slice as the first material. The second material may be deposited in a slice adjacent another slice that contains the first material. The heating may remove at least a portion of the second material. In preferred embodiments, the heating leaves minimal residue of the second material such that there is no significant residue that would interfere with the subsequent steps in the process or the operation of the device being constructed. More preferably, this leaves no measurable reside of the portion of the second material.

In some embodiments, the second material may add thermal energy to the first material during heating. The second material may have a radiation absorbance that is at least 5 times that of the first material; the second material has a radiation absorbance that is at least 10 times that of the first material; the second material has a radiation absorbance that is at least 50 times that of the first material or the second material has a radiation absorbance that is at least 100 times that of the first material.

In some embodiments, the second material may have a peak absorbance wavelength no less than 200 nm, or 250 nm, or 300 nm, or 400 nm, or 500 nm. The first material may have a peak absorbance wavelength no greater than 700 nm, or 600 nm, or 500 nm, or 400 nm, or 300 nm. The EMR may have a peak wavelength no less than 200 nm, or 250 nm, or 300 nm, or 400 nm, or 500 nm.

In some embodiments, the second material may comprise copper, copper oxides, CGO, or combinations thereof. The first material may comprise YSZ, CGO, NiO-YSZ, LSM-YSZ, other metal oxides or combinations thereof. The second material may comprise copper, copper oxides, or steel. Carbon may comprise graphite, graphene, carbon nanoparticles, nano diamonds or combinations thereof.

In some embodiments, the deposition method comprises material jetting, binder jetting, inkjet printing, aerosol jetting, aerosol jet printing, vat photopolymerization, powder bed fusion, material extrusion, directed energy deposition, sheet lamination, ultrasonic inkjet printing or combinations thereof.

In some embodiments, the deposition method further comprises one or more of the steps of controlling distance from the EMR to the receiver, EMR energy density, EMR spectrum, EMR voltage, EMR exposure duration, EMR exposure area, EMR exposure volume, EMR burst frequency, EMR exposure repetition number. The object may not change location between the deposition and heating steps. EMR may have a power output of no less than 1 W, or 10 W, or 100 W, or 1000 W.

Also disclosed herein is a system comprising at least one deposition nozzle, an electromagnetic radiation (EMR) source and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

The following detailed description describes the production of solid oxide fuel cells (SOFCs) for illustrative purposes. As one in the art recognizes, the methodology and the manufacturing processes are applicable to all fuel cell types. As such, the production of all fuel cell types is within the scope of this disclosure.

Treatment Process

In various embodiments, a copper electrode is sintered using a treatment process as described herein. Herein disclosed is a treatment process that comprises one or more of the following effects: heating, drying, curing, sintering, annealing, sealing, alloying, evaporating, restructuring, foaming or sintering. A preferred treatment process is sintering. The treatment process comprises exposing a substrate to a source of electromagnetic radiation (EMR). In some embodiments, EMR is exposed to a substrate having a first material. In various embodiments, the EMR has a peak wavelength ranging from 10 to 1500 nm. In various embodiments, the EMR has a minimum energy density of 0.1 $Joule/cm^2$. In an embodiment, the EMR has a burst frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V. For example, a single pulse of EMR is applied with an exposure distance of about 10 mm and an exposure duration of 5-20 ms. For example, multiple pulses of EMR are applied at a burst frequency of 100 Hz with an exposure distance of about 10 mm and an exposure duration of 5-20 ms. In some embodiments, the EMR consists of one exposure. In other embodiment, the EMR comprises no greater than 10 exposures, or no greater than 100 exposures, or no greater than 1000 exposures, or no greater than 10,000 exposures.

In various embodiments, metals and ceramics are sintered almost instantaneously (milliseconds for <<10 microns) using pulsed light. The sintering temperature may be controlled to be in the range of 100° C. to 2000° C. The sintering temperature may be tailored as a function of depth. In one example, the surface temperature is 1000° C. and the sub-surface is kept at 100° C., wherein the sub-surface is 100 microns below the surface. In some embodiments, the material suitable for this treatment process includes yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel, or combinations thereof.

This treatment process is applicable in the manufacturing process of a fuel cell. In preferred embodiments, a layer in a fuel cell (i.e., anode, cathode, electrolyte, seal, catalyst, etc) is treated using processes described herein to be heated, cured, sintered, sealed, alloyed, foamed, evaporated, restructured, dried or annealed or combinations thereof. In preferred embodiments, a portion of a layer in a fuel cell is treated using processes described herein to be heated, cured, sintered, sealed, alloyed, foamed, evaporated, restructured, dried, annealed, or combinations thereof. In preferred embodiments, a combination of layers of a fuel cell are treated using processes described herein to be heated, cured, sintered, sealed, alloyed, foamed, evaporated, restructured, dried, annealed or combinations thereof, wherein the layers may be a complete layer or a partial layer.

The treatment process of this disclosure is preferably rapid, with the treatment duration varied from microseconds to milliseconds. The treatment duration may be accurately controlled. The treatment process of this disclosure may produce fuel cell layers that have no cracks or have minimal cracking. The treatment process of this disclosure controls the power density or energy density in the treatment volume (the volume of an object being treated) of the material being treated. The treatment volume may be accurately controlled. In an embodiment, the treatment process of this disclosure provides the same energy density or different energy densities in a treatment volume. In an embodiment, the treatment process of this disclosure provides the same treatment duration or different treatment durations in a treatment volume. In an embodiment, the treatment process of this disclosure provides simultaneous treatment for one or more treatment volumes. In an embodiment, the treatment process of this disclosure provides simultaneous treatment for one or more fuel cell layers or partial layers or combination of layers. In an embodiment, the treatment volume is varied by changing the treatment depth.

In an embodiment, a first portion of a treatment volume is treated by electromagnetic radiation of a first wavelength; a second portion of the treatment volume is treated by electromagnetic radiation of a second wavelength. In some cases, the first wavelength is the same as the second wavelength. In some cases, the first wavelength is different from the second wavelength. In an embodiment, the first portion of a treatment volume has a different energy density from the second portion of the treatment volume. In an embodiment, the first portion of a treatment volume has a different treatment duration from the second portion of the treatment volume.

In an embodiment, the EMR has a broad emission spectrum so that the desired effects are achieved for a wide range of materials having different absorption characteristics. In this disclosure, absorption of electromagnetic radiation (EMR) refers to the process, wherein the energy of a photon is taken up by matter, such as the electrons of an atom. Thus, the electromagnetic energy is transformed into internal energy of the absorber, for example, thermal energy. For example, the EMR spectrum extends from the deep ultraviolet (UV) range to the near infrared (IR) range, with peak pulse powers at 220 nm wavelength. The power of such EMR is on the order of Megawatts. Such EMR sources perform tasks such as breaking chemical bonds, sintering, ablating or sterilizing.

In an embodiment, the EMR has an energy density of no less than 0.1, 1, or 10 Joule/cm$^2$. In an embodiment, the EMR has a power output of no less than 1 watt (W), 10 W, 100 W, 1000 W. The EMR delivers power to the substrate of no less than 1 W, 10 W, 100 W, 1000 W. In an embodiment, such EMR exposure heats the material in the substrate. In an embodiment, the EMR has a range or a spectrum of different wavelengths. In various embodiments, the treated substrate is at least a portion of an anode, cathode, electrolyte, catalyst, barrier layer, or interconnect of a fuel cell.

In an embodiment, the peak wavelength of the EMR is between 50 and 550 nm or between 100 and 300 nm. In an embodiment, the absorption of at least a portion of the substrate for at least one frequency of the EMR between 10 and 1500 nm is no less than 30% or no less than 50%. In an embodiment, the absorption of at least a portion of the substrate for at least one frequency between 50 and 550 nm is no less than 30% or no less than 50%. In an embodiment, the absorption of at least a portion of the substrate for at least one frequency between 100 and 300 nm is no less than 30% or no less than 50%.

Sintering is the process of compacting and forming a solid mass of material by heat or pressure without melting it to the point of liquefaction. In this disclosure, the substrate under EMR exposure is sintered but not melted. In preferred embodiments, the EMR comprises one or more of UV light, near ultraviolet light, near infrared light, infrared light, visible light, laser, electron beam, microwave. In an embodiment, the substrate is exposed to the EMR for no less than 1 microsecond, no less than 1 millisecond. In an embodiment, the substrate is exposed to the EMR for less than 1 second at a time or less than 10 seconds at a time. In an embodiment, the substrate is exposed to the EMR for less than 1 second or less than 10 seconds. In an embodiment, the substrate is exposed to the EMR repeatedly, for example, more than 1 time, more than 3 times, more than 10 times. In an embodiment, the substrate is distanced from the source of the EMR for less than 50 cm, less than 10 cm, less than 1 cm, or less than 1 mm.

In various embodiments, one or a combination of parameters may be controlled, wherein such parameters include distance between the EMR source and the substrate, the energy density of the EMR, the spectrum of the EMR, the voltage of the EMR, the duration of exposure, the burst frequency and the number of EMR exposures. Preferably, these parameters are controlled to minimize the formation of cracks in the substrate.

In an embodiment, the EMR energy is delivered to a surface area of no less than 1 mm$^2$, or no less than 1 cm$^2$, or no less than 10 cm$^2$, or no less than 100 cm$^2$. In some cases, during EMR exposure of the first material, at least a portion of an adjacent material is heated at least in part by conduction of heat from the first material. In various embodiments, the layers of the fuel cell (e.g., anode, cathode, electrolyte) are thin. Preferably they are no greater than 30 microns, no greater than 10 microns, or no greater than 1 micron.

In some embodiments, the first material of the substrate is in the form of a powder, sol gel, colloidal suspension, hybrid solution or sintered material. In various embodiments, the second material may be added by vapor deposition. In preferred embodiments, the second material coats the first material. In preferred embodiments, the second material reacts with light, (e.g. focused light), as by a laser, and sintered or annealed with the first material.

The preferred treatment process of this disclosure enables rapid manufacturing of fuel cells by eliminating traditional, costly, time consuming, expensive sintering processes and replacing them with rapid, in situ methods that allow continuous manufacturing of the layers of a fuel cell in a single machine if desired. This process also shortens sintering time from hours and days to seconds or milliseconds or even microseconds.

In various embodiments, this treatment method is used in combination with manufacturing techniques like screen printing, tape casting, spraying, sputtering, physical vapor deposition and additive manufacturing.

This preferred treatment method enables tailored and controlled heating by tuning EMR characteristics (such as, wavelengths, energy density, burst frequency, and exposure duration) combined with controlling thicknesses of the layers of the substrate and heat conduction into adjacent layers to allow each layer to sinter, anneal, or cure at each desired target temperature. This process enables more uniform energy applications, decreases or eliminates cracking, which improves electrolyte performance. The substrate treated with this preferred process also has less thermal stress due to more uniform heating.

Fuel Cell

A fuel cell is an electrochemical apparatus that converts the chemical energy from a fuel into electricity through an electrochemical reaction. Copper electrodes are particularly useful in solid oxide fuel cells (SOFCs). When electricity is introduced to the same apparatus, it becomes an electrolyser, turning electrical energy into chemical energy. As such, copper electrodes are also applicable for electrolysers.

A fuel cell typically comprises an anode, a cathode, an electrolyte, an interconnect, optionally a barrier layer and/or optionally a catalyst. Both the anode and the cathode are electrodes. The listings of material for the electrodes, the electrolyte, and the interconnect in a fuel cell are applicable in some cases to the EC gas producer and the EC compressor. These listings are only examples and not limiting. Furthermore, the designations of anode material and cathode material are also not limiting because the function of the material during operation (e.g., whether it is oxidizing or reducing) determines whether the material is used as an anode or a cathode.

Figure 2:
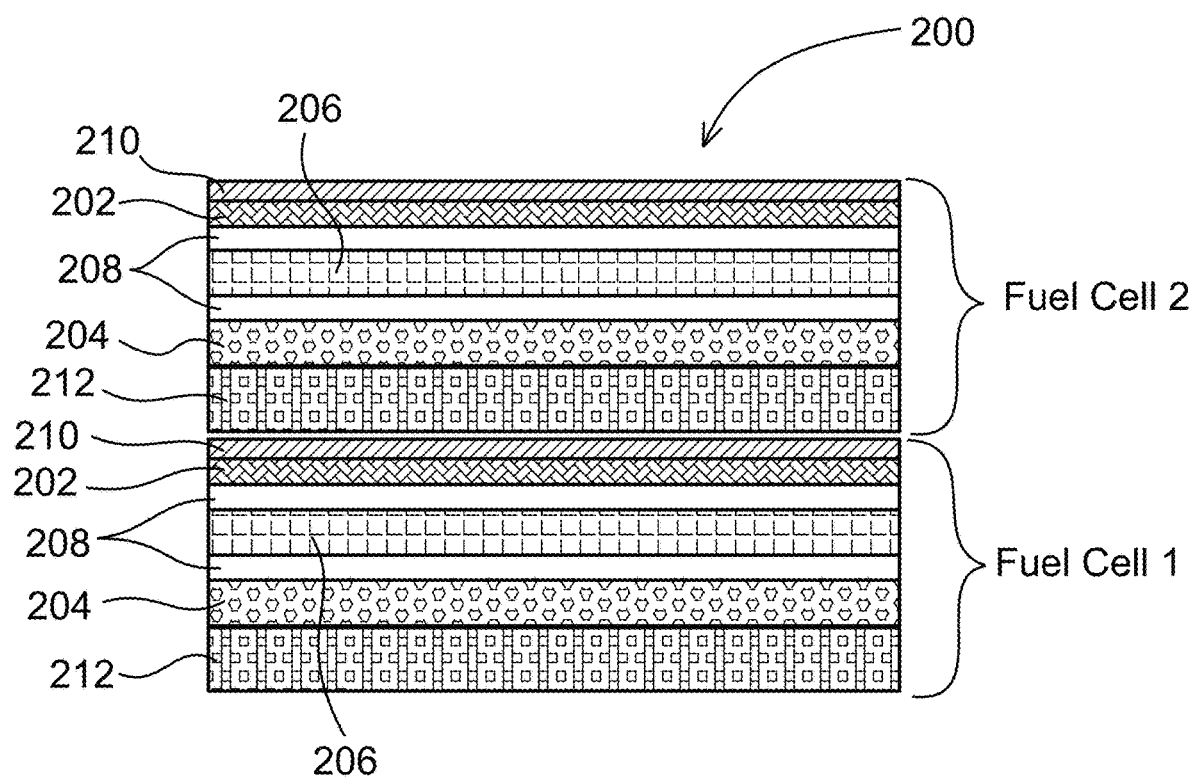
FIG. 2 schematically illustrates two fuel cells in a fuel cell stack, according to an embodiment of the disclosure.

FIG. 2 schematically illustrates two fuel cells in a fuel cell stack 200. The two fuel cells are denoted "Fuel Cell 1" and "Fuel Cell 2". Stack 200 may comprise two or more fuel cells though only two are shown for illustrative purposes. Each fuel cell in FIG. 2 comprises an anode layer 202, cathode layer 204, electrolyte layer 206, barrier layers 208, catalyst layer 210 and interconnect layer 212. Two fuel cell repeat units or two fuel cells form a stack 200 as illustrated. As is seen, on one side interconnect 212 is in contact with the largest surface of cathode 204 of fuel cell 2 (or fuel cell repeat unit) and on the opposite side interconnect 212 is in contact with the largest surface of catalyst 210 (optional) or the anode 202 of bottom fuel cell 2 (or fuel cell repeat unit). These repeat units or fuel cells are connected in parallel by being stacked atop one another and sharing an interconnect 212 in between via direct contact with the interconnect 212 rather than via electrical wiring. This kind of configuration illustrated in FIG. 2 contrasts with segmented-in-series (SIS) type fuel cells.

The cathode layer 204 may comprise perovskites, such as LSC, LSCF or LSM. In some embodiments, the cathode 204 comprises one or more of lanthanum, cobalt, strontium or manganite. The cathode 204 may be porous. The cathode 204 may comprise one or more of YSZ, nitrogen, nitrogen boron doped graphene, $La_{0.6}Sr_{0.4}Co_{0.2}Fe_{0.8}O_3$, $SrCo_{0.5}Sc_{0.5}O_3$, $BaFe_{0.75}Ta_{0.25}O_3$, $BaFe_{0.875}Re_{0.125}O_3$, $Ba_{0.5}La_{0.125}Zn_{0.375}NiO_3$, $Ba_{0.75}Sr_{0.25}Fe_{0.875}Ga_{0.125}O_3$, $BaFe_{0.125}Co_{0.125}$, $Zr_{0.75}O_3$. The cathode 204 may comprise LSCo, LCo, LSF, LSCoF, or a combination thereof. The cathode 204 may comprise perovskites $LaCoO_3$, $LaFeO_3$, $LaMnO_3$, $(La,Sr)MnO_3$, LSM-GDC, LSCF-GDC, LSC-GDC. Cathodes containing LSCF are suitable for intermediate-temperature fuel cell operation. The cathode 204 may comprise a material selected from the group consisting of lanthanum strontium manganite, lanthanum strontium ferrite, and lanthanum strontium cobalt ferrite. In preferred embodiments, the cathode comprises lanthanum strontium manganite.

The anode 202 may be a copper-containing anode as described herein. The anode 202 may be porous. The anode 202 may comprise a combination of electrolyte material and electrochemically active material or a combination of electrolyte material and electrically conductive material. In a preferred embodiment, the anode 202 comprises nickel and yttria stabilized zirconia. In a preferred embodiment, the anode 202 is formed by reduction of a material comprising nickel oxide and yttria stabilized zirconia. In a preferred embodiment, the anode 202 comprises nickel and gadolinium stabilized ceria. In a preferred embodiment, the anode 202 is formed by reduction of a material comprising nickel oxide and gadolinium stabilized ceria.

In some embodiments, the electrolyte 206 may comprise stabilized zirconia (e.g., YSZ, YSZ-8, $Y_{0.16}Zr_{0.84}O_2$), doped $LaGaO3$, (e.g., LSGM, $La_{0.9}Sr_{0.1}Ga_{0.8}Mg0.2O_3$), doped ceria, (e.g., GDC, $Gd_{0.2}Ce_{0.8}O_2$) or stabilized bismuth oxide (e.g., BVCO, $Bi2V_{0.9}Cu_{0.1}O_{5.35}$). he electrolyte 206 may comprise zirconium oxide, yttria stabilized zirconium oxide (also known as YSZ, YSZ8 (8 mole % YSZ)), ceria, gadolinia, scandia, magnesia or calcia or a combination thereof. The electrolyte 206 may be sufficiently impermeable to prevent significant gas transport and prevent significant electrical conduction; and allow ion conductivity. The electrolyte 206 may comprise doped oxide such as cerium oxide, yttrium oxide, bismuth oxide, lead oxide, lanthanum oxide. The electrolyte 206 may comprise perovskite, such as, $LaCoFeO_3$ or $LaCoO_3$ or $Ce_{0.9}Gd_{0.1}O_2$ (GDC) or $Ce_{0.9}Sm_{0.1}O_2$ (SDC, samaria doped ceria) or scandia stabilized zirconia or a combination thereof. he electrolyte 206 may comprise a material selected from the group consisting of zirconia, ceria, and gallia. The material may be stabilized with a stabilizing material selected from the group consisting of scandium, samarium, gadolinium, and yttrium. The material may comprise yttria stabilized zirconia.

In some embodiments, interconnect 212 comprises silver, gold, platinum, AISI441, ferritic stainless steel, stainless steel, lanthanum, chromium, chromium oxide, chromite, cobalt, cesium, $Cr_2O_3$, or a combination thereof. In some embodiments, anode 202 comprises a $LaCrO_3$ coating on $Cr_2O_3$ or $NiCo_2O_4$ or $MnCo_2O_4$ coatings. The interconnect 212 surface may be coated with cobalt or cesium or both. The interconnect 212 may comprise ceramics. The interconnect 212 may comprise lanthanum chromite or doped lanthanum chromite. The interconnect 212 may comprise a material further comprising metal, stainless steel, ferritic steel, crofer, lanthanum chromite, silver, metal alloys, nickel, nickel oxide, ceramics, or lanthanum calcium chromite, or a combination thereof.

In various embodiments, one or more fuel cells in stack 200 may comprise a catalyst 210, such as, platinum, palladium, scandium, chromium, cobalt, cesium, $CeO_2$, nickel, nickel oxide, zinc, copper, titania, ruthenium, rhodium, $MoS_2$, molybdenum, rhenium, vanadium, manganese, magnesium or iron or a combination thereof. The catalyst 210 may promote methane reforming reactions to generate hydrogen and carbon monoxide such that they may be oxidized in the fuel cell. Very often, the catalyst is part of the anode 202, especially nickel anode which has inherent methane reforming properties. The catalyst 210 may be between 1%-5%, or 0.1% to 10% by mass. The catalyst 210 may be used on the anode 202 surface or in the anode 202. In various embodiments, such anode catalysts can reduce harmful coking reactions and carbon deposits. Simple oxide versions of catalysts or perovskite may be used as catalysts. For example, about 2% mass $CeO_2$ catalyst is used for methane-powered fuel cells. The catalyst may be dipped or coated on the anode 202. The catalyst 210 may be made by an additive manufacturing machine (AMM) and incorporated into the fuel cell using the AMM.

The unique manufacturing methods discussed herein have described the assembly of ultra-thin fuel cells and fuel cell stacks. Conventionally, to achieve structural integrity, the fuel cell has at least one thick layer per repeat unit. This may be the anode (such as an anode-supported fuel cell) or the interconnect (such as an interconnect-supported fuel cell). As discussed above, pressing or compression steps are typically necessary to assemble the fuel cell components to achieve gas tightness and/or proper electrical contact in traditional manufacturing processes. As such, the thick layers are necessary not only because traditional methods (like tape casting) cannot produce ultra-thin layers but also because the layers must be thick to endure the pressing or compression steps. The preferred manufacturing methods of this disclosure have eliminated the need for pressing or compression. The preferred manufacturing methods of this disclosure have also enabled the making of ultra-thin layers. The multiplicity of the layers in a fuel cell or a fuel cell stack provides sufficient structural integrity for proper operation when they are made according to this disclosure.

Herein disclosed is a fuel cell comprising an anode no greater than 1 mm or 500 microns or 300 microns or 100 microns or 50 microns or no greater than 25 microns in thickness. The cathode no greater than 1 mm or 500 microns or 300 microns or 100 microns or 50 microns or no greater than 25 microns in thickness. The electrolyte no greater than 1 mm or 500 microns or 300 microns or 100 microns or 50 microns or 30 microns in thickness. The fuel cell may comprise an interconnect having a thickness of no less than 50 microns. In some cases, a fuel cell comprises an anode no greater than 25 microns in thickness, a cathode no greater than 25 microns in thickness, and an electrolyte no greater than 10 microns or 5 microns in thickness. The fuel cell may comprise an interconnect having a thickness of no less than 50 microns. The interconnect may have a thickness in the range of 50 microns to 5 cm.

In a preferred embodiment, a fuel cell comprises an anode no greater than 100 microns in thickness, a cathode no greater than 100 microns in thickness, an electrolyte no greater than 20 microns in thickness, and an interconnect no greater than 30 microns in thickness. In a more preferred embodiment, a fuel cell comprises an anode no greater than 50 microns in thickness, a cathode no greater than 50 microns in thickness, an electrolyte no greater than 10 microns in thickness, and an interconnect no greater than 25 microns in thickness. The interconnect may have a thickness in the range of 1 micron to 20 microns.

In a preferred embodiment, the fuel cell comprises a barrier layer between the anode and the electrolyte, or a barrier layer between the cathode and the electrolyte, or both barrier layers. In some cases, the barrier layers are the interconnects. In such cases, the reactants are directly injected into the anode and the cathode.

In an embodiment, the cathode has a thickness of no greater than 15 microns, or no greater than 10 microns, or no greater than 5 microns. The anode may have a thickness no greater than 15 microns, or no greater than 10 microns, or no greater than 5 microns. The electrolyte may have a thickness of no greater than 5 microns, or no greater than 2 microns, or no greater than 1 micron, or no greater than 0.5 micron.

The interconnect may be made of a material comprising metal, stainless steel, silver, metal alloys, nickel, nickel oxide, ceramics, lanthanum chromite, doped lanthanum chromite, or lanthanum calcium chromite. In an embodiment, the fuel cell has a total thickness of no less than 1 micron.

Also discussed herein is a fuel cell stack comprising a multiplicity of fuel cells, wherein each fuel cell comprises an anode no greater than 25 microns in thickness, a cathode no greater than 25 microns in thickness, an electrolyte no greater than 10 microns in thickness, and an interconnect having a thickness in the range from 100 nm to 100 microns. Each fuel cell may comprise a barrier layer between the anode and the electrolyte, or a barrier layer between the cathode and the electrolyte, or both barrier layers. The barrier layers may act as the interconnects. For example, the interconnect may have a thickness in the range from 500 nm to 1000 nm. The interconnect may be made of a material comprising metal, stainless steel, silver, metal alloys, nickel, nickel oxide, ceramics, or lanthanum calcium chromite.

In an embodiment, the cathode has a thickness of no greater than 15 microns, or no greater than 10 microns, or no greater than 5 microns. The anode has a thickness of no greater than 15 microns, or no greater than 10 microns, or no greater than 5 microns. The electrolyte may have a thickness of no greater than 5 microns, or no greater than 2 microns, or no greater than 1 micron, or no greater than 0.5 micron. Each fuel cell may have a total thickness of no less than 1 micron.

Further discussed herein is a method of making a fuel cell comprising (a) forming an anode no greater than 25 microns in thickness, (b) forming a cathode no greater than 25 microns in thickness, and (c) forming an electrolyte no greater than 10 microns in thickness. Steps (a)-(c) may be performed using additive manufacturing. The additive manufacturing may employ one or more of extrusion, photopolymerization, powder bed fusion, material jetting, binder jetting, directed energy deposition or lamination.

In an embodiment, the method comprises assembling the anode, the cathode, and the electrolyte using additive manufacturing. In an embodiment, the method comprises forming an interconnect and assembling the interconnect with the anode, the cathode, and the electrolyte.

In preferred embodiments, the method comprises making at least one barrier layer. In preferred embodiments, the at least one barrier layer is used between the electrolyte and the cathode or between the electrolyte and the anode, or both. In an embodiment, the at least one barrier layer also acts as an interconnect.

In a preferred embodiment, the heating employs electromagnetic radiation (EMR). In various embodiments, EMR comprises UV light, near ultraviolet light, near infrared light, infrared light, visible light, laser, electron beam. Preferably, heating is performed in situ.

Electrochemical (EC) Gas Producer

Figure 3A:
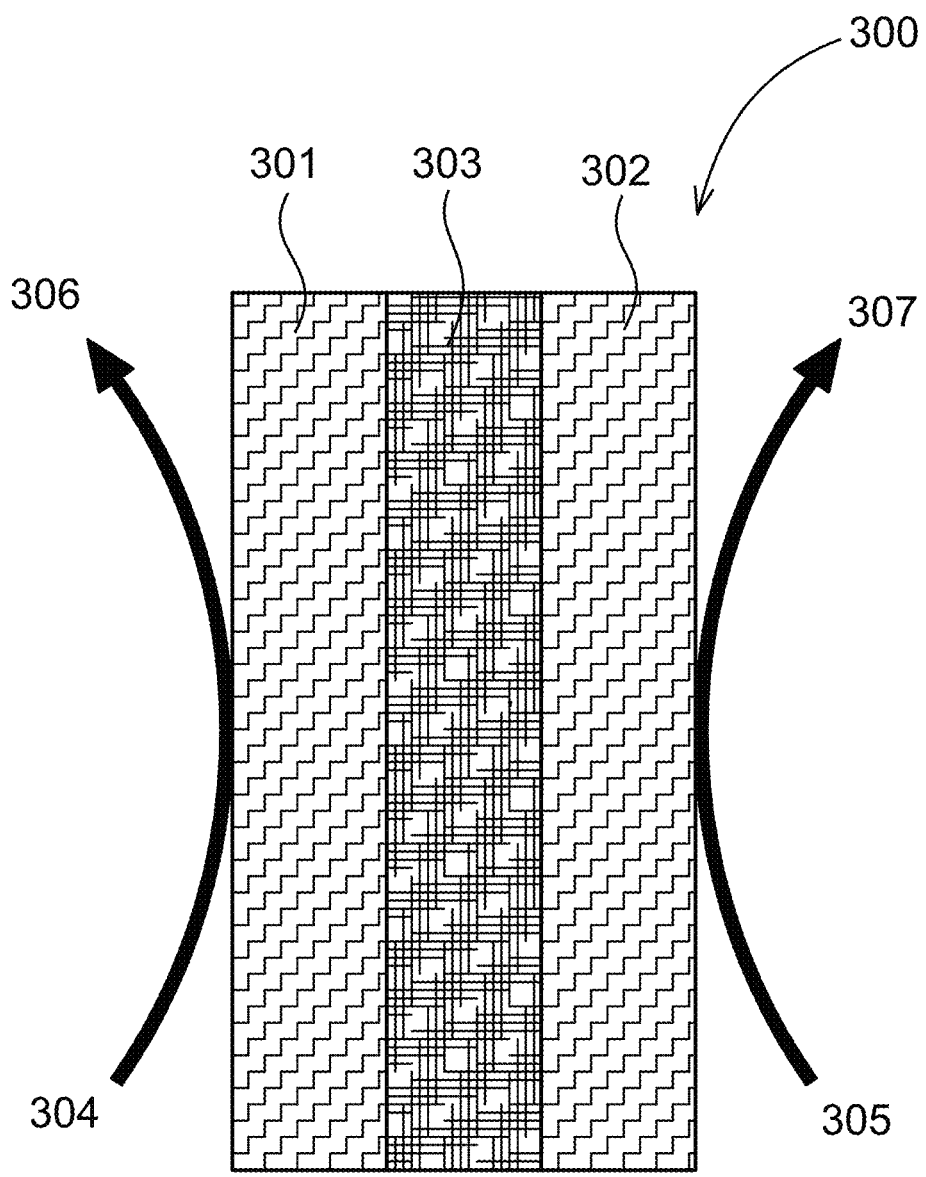
FIG. 3A illustrates an electrochemical (EC) gas producer, according to an embodiment of this disclosure.

Copper-containing electrodes are also applicable in an electrochemical (EC) gas producer that produces hydrogen or syngas or both. FIG. 3A illustrates an electrochemical (EC) gas producer 300, according to an embodiment of this disclosure. EC gas producer device 300 comprises first electrode 301, electrolyte 303 a second electrode 302. First electrode 301 is configured to receive a fuel and no oxygen 304. Second electrode 302 is configured to receive water or nothing as denoted by 305. Device 300 is configured to simultaneously produce hydrogen 307 from second electrode 302 and syngas 306 from first electrode 301. In an embodiment, 304 represents methane and water or methane and carbon dioxide entering device 300. In other embodiments, 303 represents an oxide ion conducting membrane. In an embodiment, first electrode 301 and second electrode 302 may comprise Ni-YSZ or NiO-YSZ. 304 represents an influx of hydrocarbon and water or hydrocarbon and carbon dioxide. 305 represents an influx of water or water and hydrogen. In some embodiments, electrode 301 comprises Cu-CGO further optionally comprising CuO or $Cu_2O$ or combinations thereof. Electrode 302 comprises Ni-YSZ or NiO-YSZ. 304 represents an influx of hydrocarbon with little to no water, with no carbon dioxide, and with no oxygen, and 305 represents an influx of water or water and hydrogen. Since water provides the oxide ion (which is transported through the electrolyte) needed to oxidize the hydrocarbon/fuel at the opposite electrode, water is considered the oxidant in this scenario.

In this disclosure, no oxygen means there is no oxygen present at first electrode 101 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101 is configured to receive methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity. In an embodiment, the device comprises a mixer configured to receive at least a portion of the first electrode product and at least a portion of the second electrode product. The mixer may be configured to generate a gas stream in which the hydrogen to carbon oxides ratio is no less than 2, or no less than 3 or between 2 and 3.

In some embodiments, the electrodes and electrolyte form a repeat unit. A device may comprise two or more repeat units separated by interconnects. In a preferred embodiment, the interconnects comprise no fluid dispersing element. In an embodiment, first electrode 101, or second electrode 102, or both the first electrode 101 and second electrode 102, comprise fluid channels. Alternatively, the first electrode 101 or second electrode 102, or both the first electrode 101 and second electrode 102, comprise fluid dispersing components.

Further discussed herein is a method comprising providing a device comprising a first 101 electrode, a second electrode 102, and an electrolyte 103 between the electrodes, introducing a fuel without oxygen to the first electrode 101, introducing water only or nothing to the second electrode 102 to generate hydrogen, extracting hydrogen from the second electrode 102, and extracting syngas from the first electrode 101. In preferred embodiments, the fuel comprises methane and water or methane and carbon dioxide. In preferred embodiments, the fuel comprises a hydrocarbon having a carbon number in the range of 1-12 or 1-10 or 1-8.

The gas producer is not a fuel cell and does not generate electricity, in various embodiments. Electricity may be applied to the gas producer at the anode and cathode in some cases. In other cases, electricity is not needed.

Herein disclosed is a device comprising a first electrode, a second electrode, and an electrolyte between the electrodes, wherein the first electrode and the second electrode comprise a metallic phase that does not contain a platinum group metal when the device is in use, and wherein the electrolyte is oxide ion conducting. In an embodiment, wherein the first electrode is a copper-containing electrode as discussed herein. In an embodiment, the first electrode is configured to receive a fuel and water or a fuel and carbon dioxide. In an embodiment, said fuel comprises a hydrocarbon or hydrogen or carbon monoxide or combinations thereof.

In an embodiment, the first electrode comprises doped or undoped ceria and a material selected from the group consisting of Cu, CuO, $Cu_2O$, Au, $Au_2O$, $Au_2O_3$, stainless steel, and combinations thereof. In an embodiment, the first electrode is configured to receive a fuel with little to no water. In an embodiment, said fuel comprises a hydrocarbon or hydrogen or carbon monoxide or combinations thereof. In an embodiment, the second electrode comprises Ni or NiO and a material selected from the group consisting of yttria-stabilized zirconia (YSZ), ceria gadolinium oxide (CGO), samaria-doped ceria (SDC), scandia-stabilized zirconia (SSZ), lanthanum strontium gallate magnesite (LSGM), and combinations thereof. In an embodiment, the second electrode is configured to receive water and hydrogen and configured to reduce the water to hydrogen. In an embodiment, the electrolyte comprises doped ceria or wherein the electrolyte comprises lanthanum chromite or a conductive metal or combination thereof and a material selected from the group consisting of doped ceria, YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. In an embodiment, the conductive metal comprises Ni, Cu, Ag, Au, or combinations thereof.

Figure 3B:
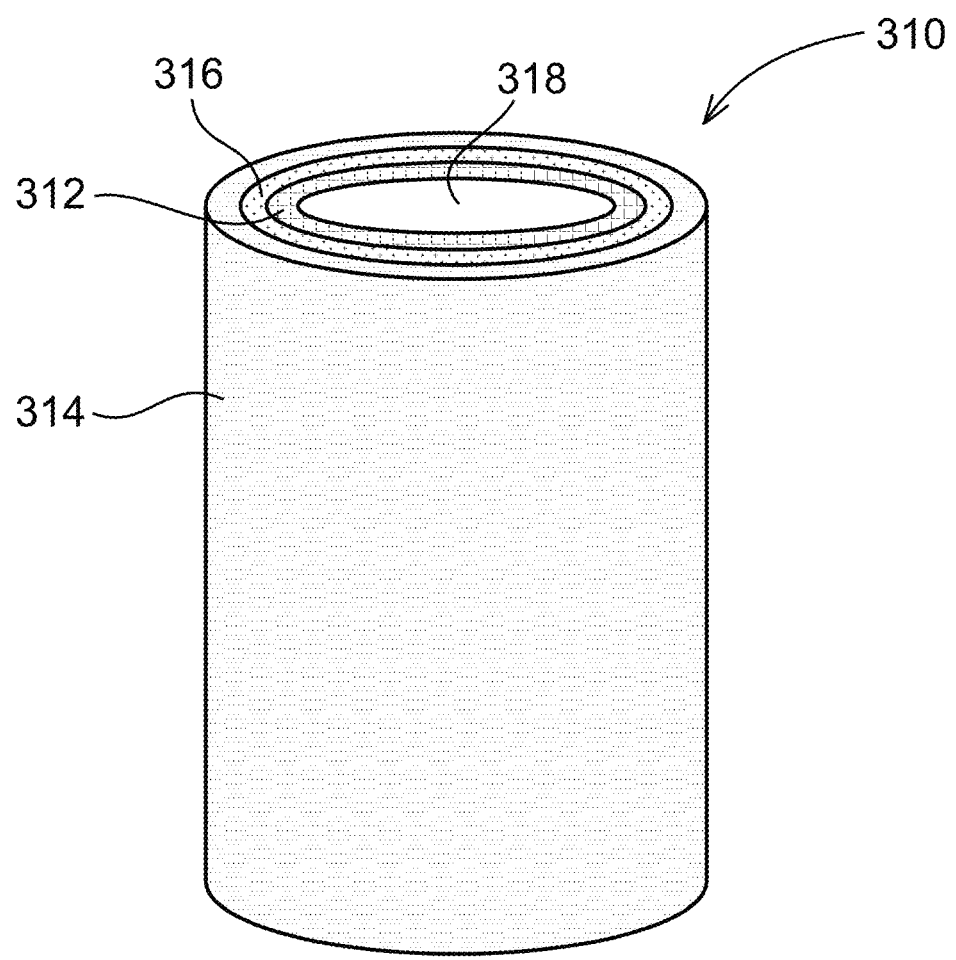
FIG. 3B illustrates a tubular EC gas producer, according to an embodiment of this disclosure.

FIG. 3B illustrates (not to scale) a tubular EC gas producer 310, according to an embodiment of this disclosure. Tubular EC gas producer 310 includes an inner tubular structure 312, an outer tubular structure 314, and an electrolyte 316 disposed between the inner and outer tubular structures 312, 314, respectively. In some embodiments, electrolyte 316 may instead comprise a membrane. Tubular gas producer 310 further includes a void space 318 for fluid passage.

In an embodiment, inner tubular structure 312 comprises an electrode. Inner tubular structure 312 may be an anode or a cathode. In an embodiment, inner tubular structure 312 may be porous. Inner tubular structure 312 may comprise Ni or NiO and a material selected from the group consisting of YSZ, CGO, samaria-doped ceria (SDC), scandia-stabilized zirconia (SSZ), LSGM, and combinations thereof. Inner tubular structure 312 may be a copper-containing electrode according to this disclosure. In an embodiment, outer tubular structure 314 comprises an electrode. Outer tubular structure 314 may be an anode or a cathode. Outer tubular structure 314 may comprise Ni or NiO and a material selected from the group consisting of YSZ, CGO, samaria-doped ceria (SDC), scandia-stabilized zirconia (SSZ), LSGM, and combinations thereof. Outer tubular structure 314 may comprise doped or undoped ceria and a material selected from the group consisting of Cu, CuO, $Cu_2O$, Ag, $Ag_2O$, Au, $Au_2O$, $Au_2O_3$, stainless steel, and combinations thereof. It should be noted that the listing of materials above is not limiting.

In embodiments, electrolyte 316 comprises doped ceria or wherein the electrolyte comprises lanthanum chromite or a conductive metal or combination thereof and a material selected from the group consisting of doped ceria, YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. In an embodiment, the conductive metal comprises Ni, Cu, Ag, Au, or combinations thereof. Electrolyte 316 is be oxide ion conducting. In some cases, electrolyte 316 is both oxide ion and electronically conducting. In some embodiments, the producer 310 further comprises one or more interconnects.

Channeled Electrodes

In various embodiments, the copper electrodes of this disclosure comprise fluid channels or fluid dispersing components, which are discussed herein. A method of making channeled electrodes comprises (a) printing a first template and a first electrode material to form a first electrode layer, wherein the first template is in contact with the first electrode material; (b) printing an electrolyte layer; (c) printing a second template and a second electrode material to form a second electrode layer, wherein the second template is in contact with the second electrode material; and (d) printing an interconnect. In a preferred embodiment, the steps are performed in any sequence. In a preferred embodiment, the method comprises repeating steps (a)-(d) in any sequence to form a stack or a repeat unit of a stack.

In an embodiment, the method comprises (e) removing at least a portion of the first template and of the second template to form channels in the first and second electrode layers. In an embodiment, the removing comprises heating, combustion, solvent treatment, oxidation, reduction, or combinations thereof. In an embodiment, the removing takes place in situ. Removing may take place after a stack or a repeat unit of a stack is printed. Removing may take place when a stack is initiated to operate. In an embodiment, the printing takes place slice by slice and a second slice is printed atop a first slice before the first slice is heated, wherein the heating removes at least a portion of the template. The printing step comprises material jetting, binder jetting, inkjet printing, aerosol jetting, or aerosol jet printing, or combinations thereof.

Further discussed herein is a method comprising (a) printing a first electrode layer; (b) printing an electrolyte layer; (c) printing a second electrode layer; and (d) printing an interconnect. In an embodiment, the printing comprises material jetting, binder jetting, inkjet printing, aerosol jetting, or aerosol jet printing. In a preferred embodiment, the steps are performed in any sequence. In a preferred embodiment, the method comprises repeating steps (a)-(d) in any sequence to form a stack or a repeat unit of a stack. Also disclosed herein is a method comprising aerosol jetting or aerosol jet printing an electrode layer, or an electrolyte layer, or an interconnect, or combinations thereof.

Figure 5B:
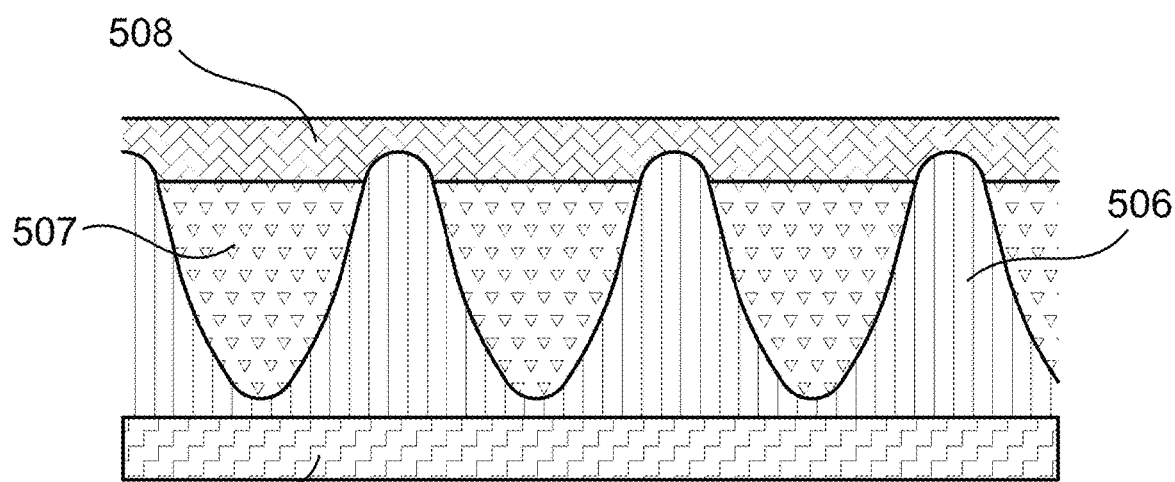
FIG. 5B is a cross-sectional view of a half cell between a second interconnect and an electrolyte, according to an embodiment of the disclosure.
Figure 5A:
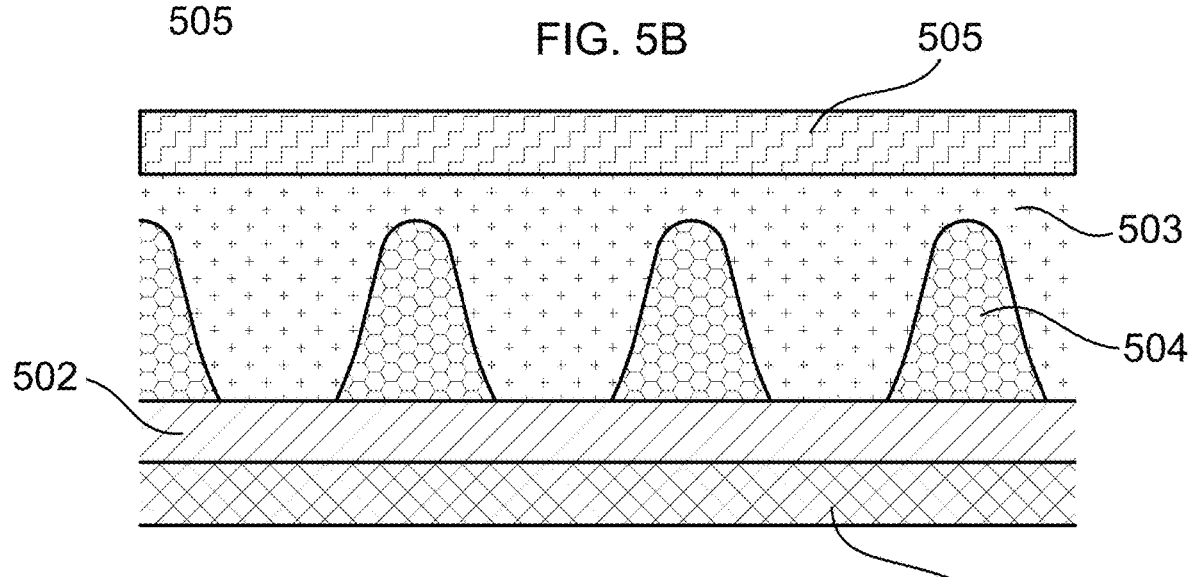
FIG. 5A is a cross-sectional view of a half cell between a first interconnect and an electrolyte, according to an embodiment of the disclosure.

FIG. 5A is a cross-sectional view of a half cell between a first interconnect and an electrolyte, according to an embodiment of the disclosure. The stack in FIG. 5A comprises a bottom/first interconnect 501, an optional layer that contains the bottom interconnect material and first electrode material 502, first electrode segments 503, first filler materials that form a first template 504 and electrolyte 505.

FIG. 5B is a cross-sectional view of a half cell between a second interconnect and an electrolyte, according to an embodiment of the disclosure. The half cell comprises an electrolyte 505, second electrode segments 506, filler materials that forms a second template 507 and a top/second interconnect 508. The views shown in FIG. 5A and FIG. 5B are perpendicular to one another.

Figures 5C, 5D:
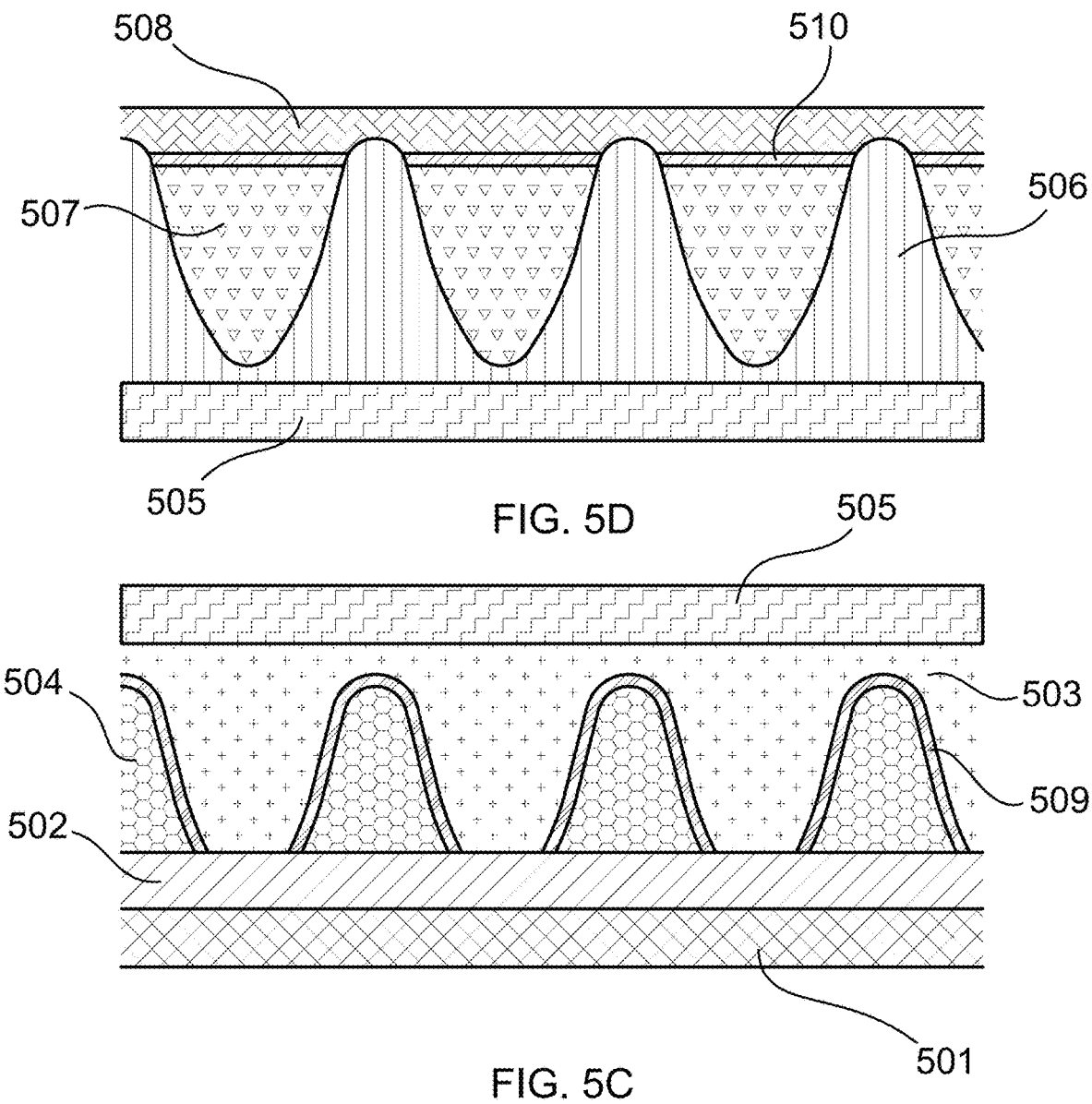
FIG. 5C is a cross-sectional view of a half cell between a first interconnect and an electrolyte, according to an embodiment of the disclosure.
FIG. 5D is a cross-sectional view of a half cell between a second interconnect and an electrolyte, according to an embodiment of the disclosure.

FIG. 5C is a cross-sectional view of a half cell between a first interconnect and an electrolyte, according to an embodiment of the disclosure. The half cell comprises a bottom interconnect 501, an optional layer that contains the bottom interconnect material and first electrode material 502, first electrode segments 503, first filler materials that forms a first template 504, electrolyte 505 and optional shields 1409 for the first filler materials when the first electrode is heated and/or sintered.

FIG. 5D is a cross-sectional view of a half cell between a second interconnect and an electrolyte, according to an embodiment of the disclosure. The half cell comprises an electrolyte 505, second electrode segments 506, filler materials that forms a second template 507, top interconnect 508 and optional shields for the second filler materials when the top interconnect is heated and/or sintered. The views shown in FIG. 5C and FIG. 5D are perpendicular to one another.

In some embodiments, there is a layer between 507 and 508 (not shown) that contains the top interconnect material and second electrode material. In some embodiments, 505 represents an electrolyte with a barrier for the first electrode or for second electrode. 509 represents optional shields for the first fillers when the first electrode is heated/sintered. 510 represents optional shields for the second fillers when the top interconnect is heated/sintered. In some instances, electrolyte 505 or electrolyte-barrier layer is in contact with the first electrode and the second electrode continuously along its opposing major faces. The shapes of the electrode segments and the fillers in these cross-sectional views are only representative and not exact. They may take on any regular or irregular shapes. The fillers and/or templates are removed when the electrochemical reactor is made (e.g., a fuel cell stack or a gas producer), for example, via heating in a furnace. Or alternatively, they are removed when the electrochemical reactor is initiated into operation via hot gas/fluid passing through, using the effects of oxidation, melting, vaporization, gasification, reduction, or combinations thereof. These removed fillers and/or templates become channels in the electrodes. In various embodiments, multiple tiers of channels are present in an electrode. For an illustrative example, an electrode is 25 microns thick with a multiplicity of channels having a height of 20 microns. For another illustrative example, an electrode is 50 microns thick with a multiplicity of channels in 2 tiers, each tier of channels having a height of 20 microns. In various embodiments, the fillers comprise carbon, graphite, graphene, cellulose, metal oxides, polymethyl methacrylate, nano diamonds, or combinations thereof.

In an embodiment, a unit in an electrochemical reactor comprising an interconnect, a first electrode, an electrolyte, and a second electrode is made via this method: providing the interconnect, depositing a first electrode material in segments on the interconnect, sintering the first electrode material, depositing a first filler material between the first electrode material segments, depositing additional first electrode material to cover the filler material, sintering the additional first electrode material and forming the first electrode, depositing an electrolyte material on the first electrode, sintering the electrolyte material to form the electrolyte, depositing a second electrode material on the electrolyte such that a multiplicity of valleys are formed in the second electrode material, sintering the second electrode material to form the second electrode, depositing a second filler material in the valleys of the second electrode, depositing a second interconnect material to cover the second electrode and the second filler material, and sintering the second interconnect material. In various embodiments, deposition is performed using inkjet printing or ultrasonic inkjet printing. In various embodiments, sintering is performed using electromagnetic radiation (EMR). In some cases, the first and second filler materials absorb little to no EMR; the absorption is so minimal that the filler materials have no measurable change. In some cases, shields are deposited to cover the first filler material or the second filler material or both so that the heating and/or sintering process for the layer on top does not cause measurable change in the first filler material or the second filler material or both. In some cases, the shields comprise YSZ, SDC, SSZ, CGO, NiO-YSZ, Cu, CuO, $Cu_2O$, LSM, LSCF, lanthanum chromite, stainless steel, LSGM, or combinations thereof.

EXAMPLES

The following example is provided as part of the disclosure of various embodiments of the present invention. As such, none of the information provided below is to be taken as limiting the scope of the invention.

Example 1. Making a Cu-CGO Electrode

A copper-containing electrode is made as follows: (1) provide 1.5 grams of CGO particles having one population of particles with an average diameter of about 20 nm and another population of particles with an average diameter of about 180 nm; (2) provide 1.5 grams of copper oxide (CuO or $Cu_2O$) particles having an average diameter of about 60 nm; (3) disperse the copper oxide particles and the ceramic particles using sonication in 100 ml of deionized water with about 2 wt % of Dispex® (BASF) to form a dispersion; (4) spraying the dispersion onto a substrate to form a slice with a thickness of about 1 micron and allowing it to dry; and (5) sintering the slice using a xenon lamp at 300V with a burst frequency of 10 Hz for a total exposure duration of 15,000 ms. When the electrode is initiated into operation, a reducing gas (e.g., $H_2$ or CO) is passed through the electrode to reduce copper oxide to copper.

Example 2. Channeled Electrodes/Fluid Dispersing Components

Figure 6:
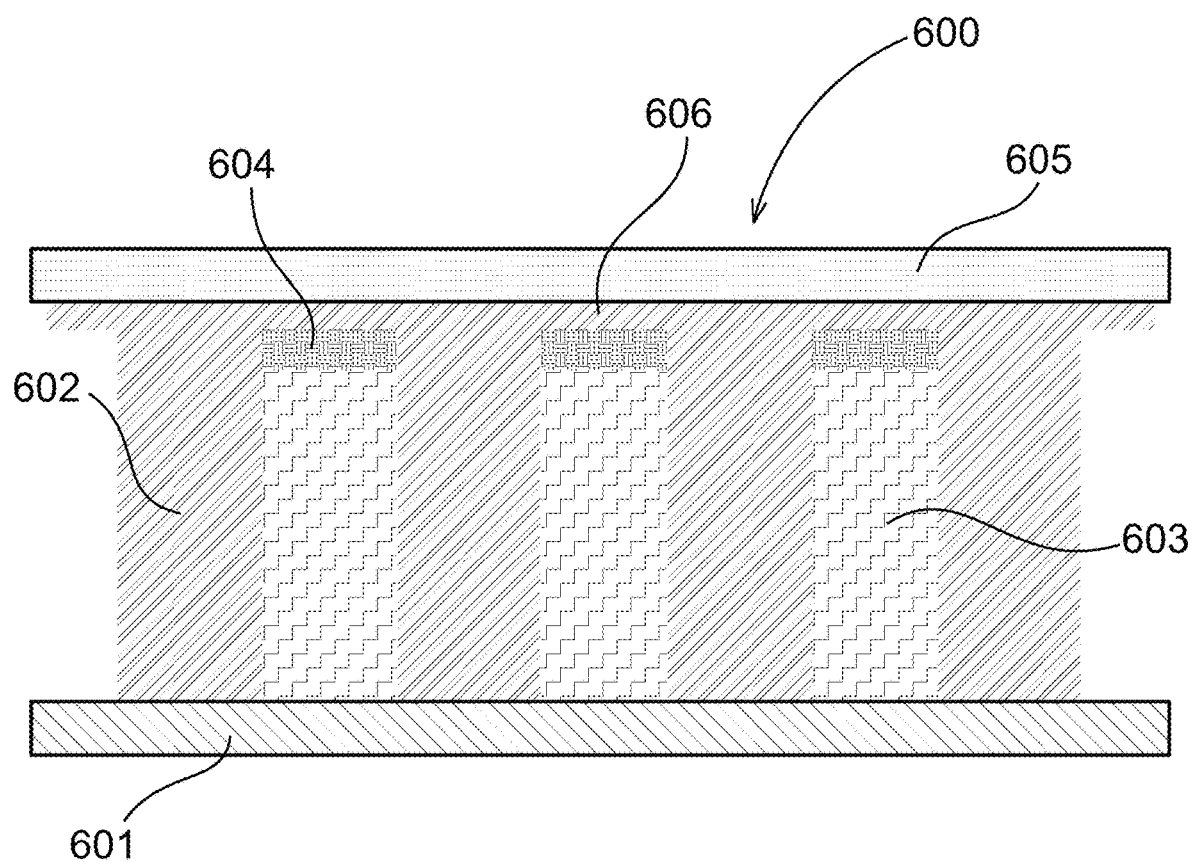
FIG. 6 schematically illustrates an example of a half cell in an EC reactor, according to an embodiment of the disclosure.

FIG. 6 schematically illustrates an example of a half cell in an electrochemical (EC) reactor. As shown in FIG. 6, half cell 600 comprises interconnect 601. Interconnect 601 comprises doped lanthanum chromite. Half cell 600 comprises anode segments 602 that are printed on interconnect 601. The anode segments are composed of NiO-YSZ or Cu-CGO. Anode segments 602 are sintered using EMR (see Example 1). Half cell 600 comprises filler material that is deposited between anode segments 602. The filler material is polymethyl methacrylate (PMMA). Half cell 600 includes shields 604 that are printed on filler materials 603 that are composed of YSZ. Additional anode material 606 is printed to cover anode segments 602 and shields 604 followed by sintering using EMR. The additional anode material is NiO-YSZ or Cu-CGO. Electrolyte 605 is printed on additional anode material 606 and sintered using EMR. Electrolyte 605 is YSZ. A barrier layer (not shown) composed of CGO is further printed on the electrolyte and sintered using EMR. A layer of cathode (not shown) composed of LSCF is printed on the CGO barrier and sintered. Cathode segments (not shown) composed of LSCF are printed on this layer and sintered. These segments form valleys and filler PMMA is deposited to fill these valleys (not shown). Shields composed of YSZ are printed on the fillers (not shown). Doped lanthanum chromite is printed to cover the shields and cathode segments and then sintered to form another interconnect (not shown). The fillers are removed by furnace heating and channeled electrodes are produced or fluid dispersing components are formed between electrolyte and interconnect (not shown).

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A method of making a copper-containing electrode precursor, the method comprising:
    (a) forming a dispersion comprising particles;
    (b) depositing the dispersion onto a substrate to form a slice; and
    (c) sintering the particles in an oxidizing atmosphere using a xenon lamp to form sintered particles,
    wherein the particles consist of ceramic particles and copper oxide particles, and
    wherein the sintered particles consist of sintered ceramic particles and sintered copper oxide particles.

2. The method of claim 1 comprising drying the slice between (b) and (c) using a non-contact dryer.

3. The method of claim 2, wherein said non-contact dryer comprises infrared heater, near infrared heater, hot air blower, ultraviolet light source, or combinations thereof.

4. The method of claim 1, wherein the dispersion has a pH that is alkaline.

5. The method of claim 1, wherein at least a population of the ceramic particles are smaller than the copper oxide particles on average.

6. The method of claim 5, wherein at least another population of the ceramic particles are larger than the copper oxide particles on average.

7. The method of claim 1, wherein the sintered copper oxide particles form a copper oxide phase and the sintered ceramic particles form a ceramic phase, and wherein the copper oxide phase and the ceramic phase are inter-dispersed with one another.

8. The method of claim 7, wherein the copper oxide phase percolates the slice.

9. The method of claim 1, wherein the ceramic particles comprise CGO, CGO-YSZ, CGO-SSZ, SDC, SDC-YSZ, SDC-SSZ, undoped ceria, undoped ceria-YSZ, undoped ceria-SSZ, or combinations thereof.

10. The method of claim 1, wherein depositing comprises inkjet printing, ultrasonic inkjet printing, material jetting, binder jetting, aerosol jetting, aerosol jet printing, dip coating, spraying, spin coating, brush coating, pasting, or combinations thereof.

11. The method of claim 1, wherein the substrate is planar or tubular.

12. The method of claim 1 comprising repeating (b) and (c) to form another slice on top of the slice.

13. The method of claim 1, wherein the ceramic particles and copper oxide particles are co-sintered in step (c).

* * * * *